(12) United States Patent
Ossipov et al.

(10) Patent No.: US 12,218,980 B2
(45) Date of Patent: Feb. 4, 2025

(54) USING AN END-TO-END POLICY CONTROLLER TO SPLIT POLICIES BETWEEN ENFORCEMENT POINTS IN A NETWORK

(71) Applicant: Cisco Technology, Inc., San Jose, CA (US)

(72) Inventors: Andrew E. Ossipov, Lewisville, TX (US); Robert Tappenden, South Melbourne (AU); Janardhanan Radhakrishnan, Dublin, CA (US); Chandrodaya Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 138 days.

(21) Appl. No.: 18/089,212

(22) Filed: Dec. 27, 2022

(65) Prior Publication Data
US 2024/0214424 A1   Jun. 27, 2024

(51) Int. Cl.
*H04L 9/40* (2022.01)
(52) U.S. Cl.
CPC .................... *H04L 63/20* (2013.01)
(58) Field of Classification Search
CPC ...................................................... H04L 63/20
USPC ............................................................ 726/1
See application file for complete search history.

(56) References Cited

U.S. PATENT DOCUMENTS

| | | | |
|---|---|---|---|
| 8,675,488 B1 | 3/2014 | Sidebottom et al. | |
| 8,689,282 B1 | 4/2014 | Oprea et al. | |
| 9,038,151 B1 * | 5/2015 | Chua | H04L 47/10 726/1 |
| 9,654,513 B1 | 5/2017 | Ashley et al. | |
| 10,084,657 B2 * | 9/2018 | Shevenell | H04L 41/12 |
| 10,616,072 B1 | 4/2020 | Lo et al. | |
| 10,742,557 B1 | 8/2020 | Miriyala et al. | |
| 11,252,192 B1 * | 2/2022 | Kwan | H04L 12/413 |
| 11,374,980 B1 | 6/2022 | Appala et al. | |

(Continued)

FOREIGN PATENT DOCUMENTS

EP   4068723 A1   10/2022

OTHER PUBLICATIONS

International Search Report and Written Opinion for International Application No. PCT/US2023/085050, mailed Mar. 20, 2024, 15 Pages.

(Continued)

*Primary Examiner* — Haresh N Patel
(74) *Attorney, Agent, or Firm* — Lee & Hayes, P.C.

(57) ABSTRACT

Techniques for using an end-to-end policy controller to utilize an inventory of enforcement points to generate a chain of enforcement points having capabilities to enforcement individual operations of an intent-based security policy associated with an entity accessing a resource. A network controller may intelligently split an intent-based security policy and send portions thereof to enforcement points along a path configured for an entity to access a resource. For example, a portion of a security policy corresponding to an operation may be mapped to and implemented by an enforcement point having a capability to perform the operation. Once each operation of a security policy has been mapped to an enforcement point, a chain of enforcement points may be generated.

20 Claims, 9 Drawing Sheets

(56) References Cited

U.S. PATENT DOCUMENTS

| | | | |
|---|---|---|---|
| 2012/0023546 A1 | 1/2012 | Kartha et al. | |
| 2014/0165134 A1 | 6/2014 | Goldschlag et al. | |
| 2016/0380831 A1 | 12/2016 | Shevenell et al. | |
| 2017/0310611 A1* | 10/2017 | Kumar | H04L 69/00 |
| 2018/0063194 A1 | 3/2018 | Vaidya et al. | |
| 2019/0245830 A1 | 8/2019 | Ratnasingham | |
| 2020/0244588 A1* | 7/2020 | Filsfils | H04L 41/12 |
| 2020/0280587 A1 | 9/2020 | Janakiraman et al. | |
| 2020/0296139 A1 | 9/2020 | Fainberg et al. | |
| 2021/0029015 A1* | 1/2021 | Khoury | H04L 45/02 |
| 2021/0168216 A1 | 6/2021 | Chunduru Venkata et al. | |
| 2022/0006726 A1 | 1/2022 | Michael et al. | |
| 2022/0014539 A1 | 1/2022 | Weingarten et al. | |
| 2022/0200915 A1* | 6/2022 | Timmons | H04L 67/14 |
| 2022/0247678 A1* | 8/2022 | Atwal | H04L 45/645 |
| 2022/0385634 A1 | 12/2022 | Fainberg | |
| 2023/0107891 A1 | 4/2023 | Miriyala et al. | |
| 2023/0112579 A1 | 4/2023 | Parenti et al. | |
| 2023/0231797 A1* | 7/2023 | Mohan | H04L 45/28 |
| | | | 709/239 |
| 2024/0022521 A1* | 1/2024 | Parla | H04L 47/11 |
| 2024/0089294 A1* | 3/2024 | Khedri | H04L 63/10 |

OTHER PUBLICATIONS

International Search Report and Written Opinion for International Application No. PCT/US2023/085058, mailed Apr. 2, 2024, 15 Pages.

Non-Final Office Action for U.S. Appl. No. 18/089,252, dated Nov. 21, 2024, 41 pages.

* cited by examiner

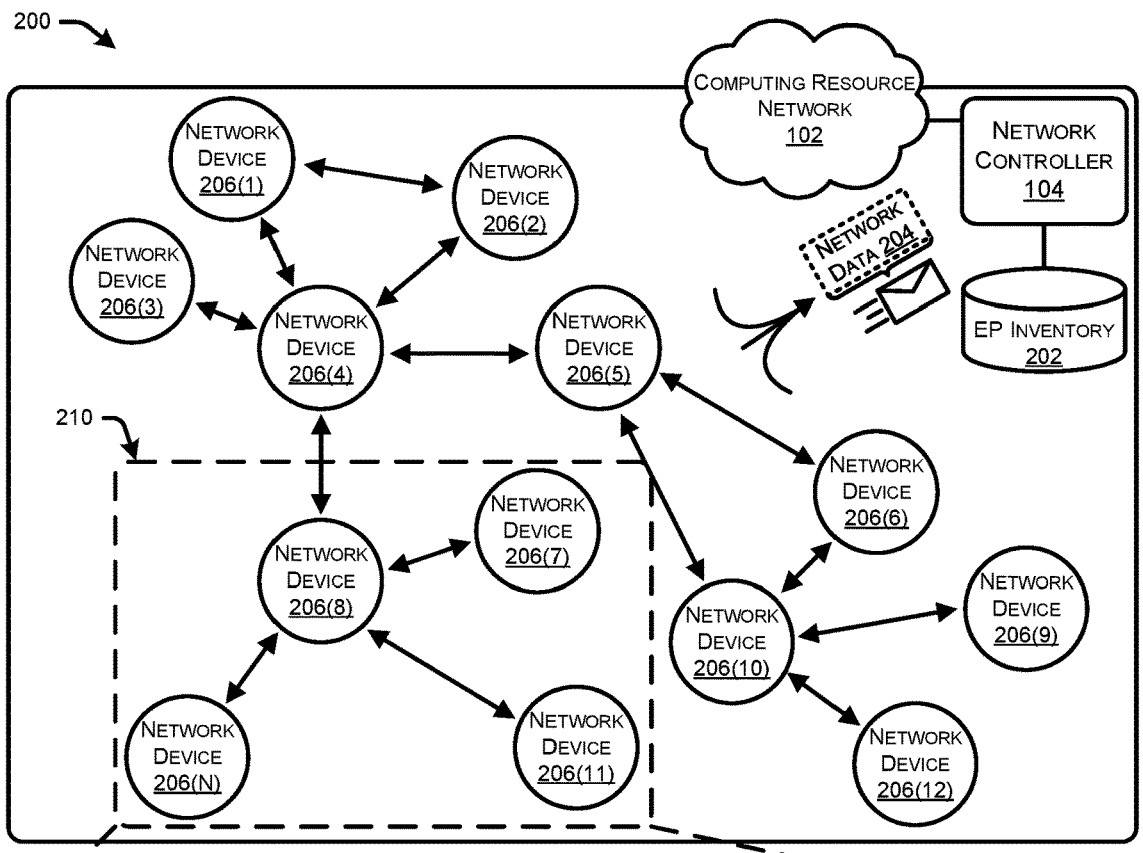
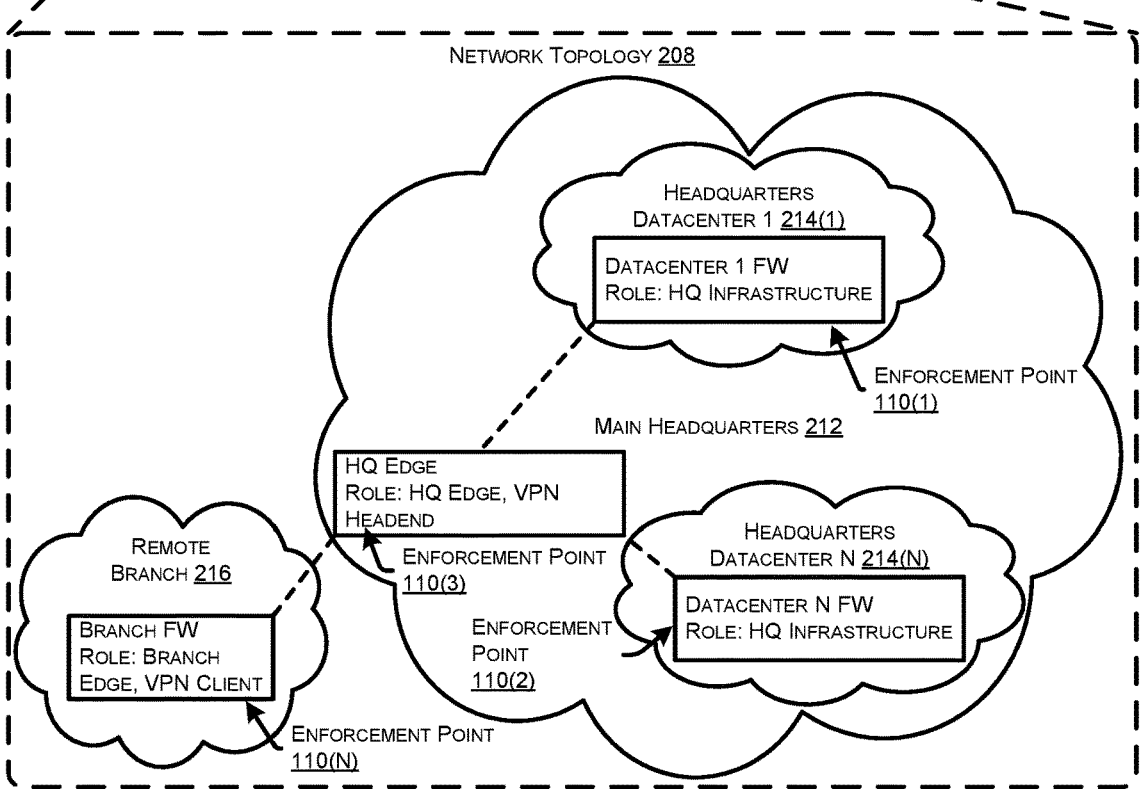
FIG. 2

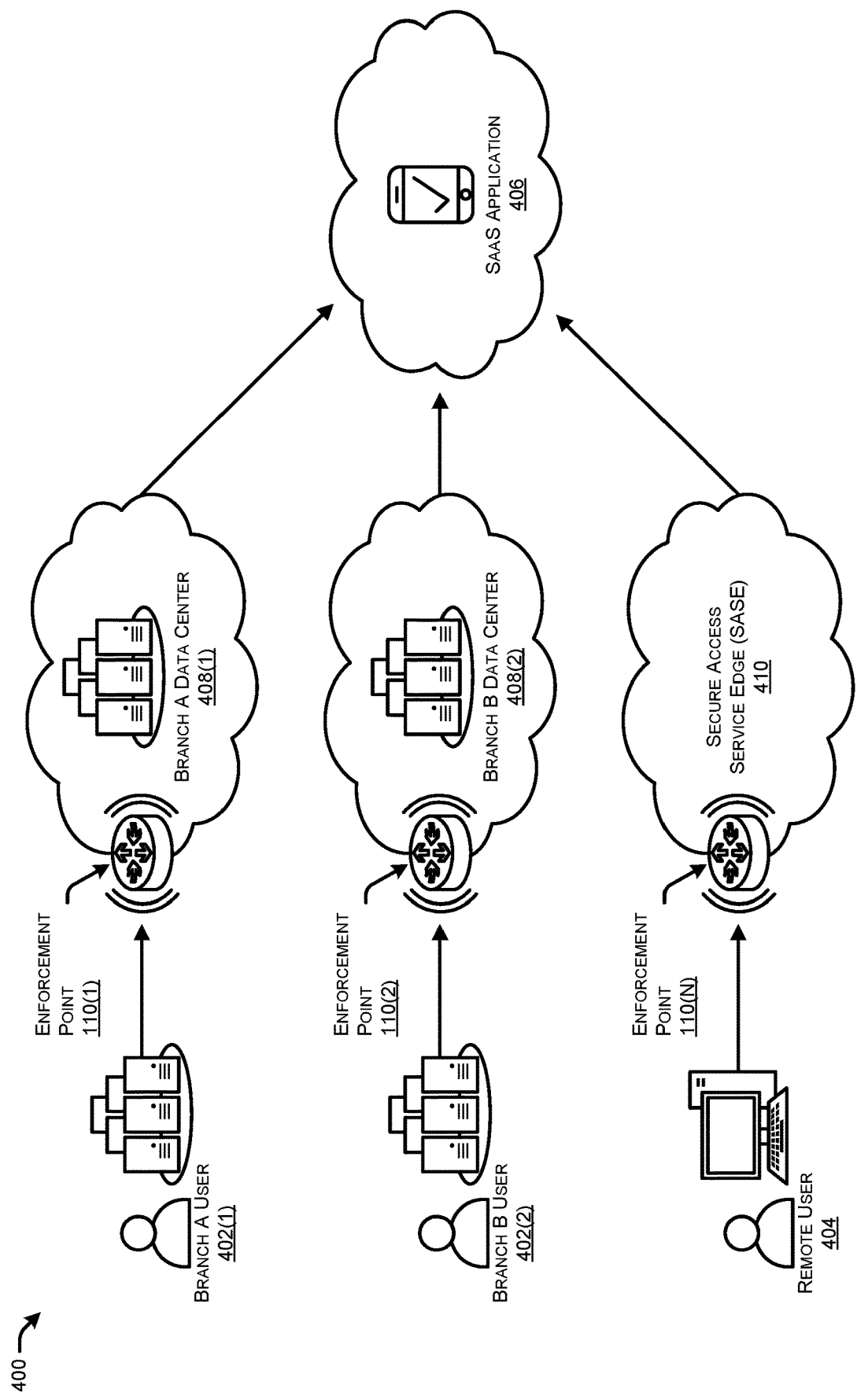

USING AN END-TO-END POLICY CONTROLLER TO SPLIT POLICIES BETWEEN ENFORCEMENT POINTS IN A NETWORK

TECHNICAL FIELD

The present disclosure relates generally to leveraging data associated with network devices in a network to identify paths between source endpoints and destination endpoints and establish an inventory of enforcement points that may be used to generate a chain of enforcement points having capabilities to enforce individual operations of an intent-based security policy associated with an entity accessing a resource.

BACKGROUND

Networks (e.g., cloud-based networks, privately deployed networks, etc.) offer services (e.g., cloud-based services, private service access, etc.) to fulfill users' computing-service needs without the users having to invest in and maintain computing infrastructure required to implement the services. For example, service providers may operate networks of data centers housing significant numbers of interconnected computing systems, such as public data centers, that are configured by the service provider to provide services to users (or "customers"). These service provider networks may provide network-based computing resources on an as-needed basis. For example, a service provider network may permit users to purchase and utilize computing resources such as virtual machine ("VM") instances, compute resources, data storage resources, database resources, networking resources, network services, and other types of computing resources. Users may configure the computing resources provided by a service provider network to implement desired functionality, such as to provide a network-based application, a managed network, and/or another type of functionality to an enterprise of users.

Network security operations users may apply security policy changes to such a managed network using network devices configured as enforcement points (e.g., a network device having capabilities to implement an operation of a security policy). However, this may take a considerable amount of time to map an exact path from a source endpoint (e.g., a user and/or an application) to a destination endpoint (e.g., a service and/or an application) across the network topology to identify all of the applicable enforcement points that must be reconfigured. This manual process is also particularly prone to errors as both users and apps may move between different locations (e.g., campus', branches, VPNs, private data centers, public clouds, etc.), which may also lead to difficulties in authoring such security policies. Further, each time a policy and/or configuration of network devices change, the network security operations users may be required to render policies across the series of devices again. As such, it may be difficult to apply security policy changes and/or render security policies across a network that is frequently changing using these manual operations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates a system architecture diagram of a computing resource network, such as, for example, a cloud computing network including a network controller configured to generate an inventory of enforcement points using network data collected from network devices and utilized to generate a network topology of the enforcement points using the techniques described herein.

FIG. 4 illustrates an example diagram depicting different chains of enforcement points for implementing an end-to-end security policy in a computing resource network according to the techniques described herein.

DESCRIPTION OF EXAMPLE EMBODIMENTS

Overview

Figure 1:
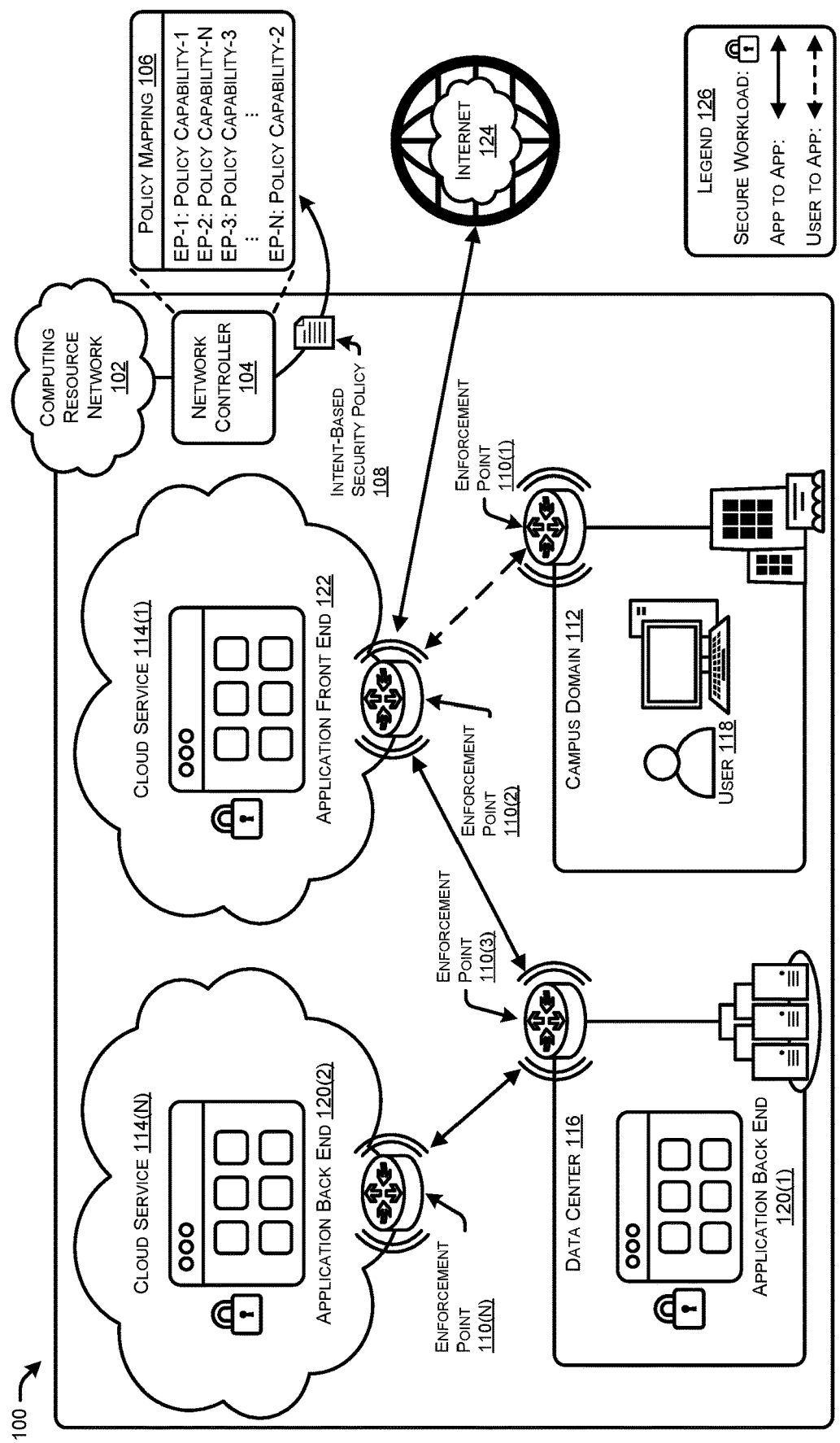
FIG. 1 illustrates a system architecture diagram of a computing resource network, such as, for example, a cloud computing network including a network controller configured to map intent-based security policies to enforcement points having capabilities to implement operations associated with the policies along a path of network traffic between a source endpoint and a destination endpoint.

This disclosure describes methods for a network controller to leverage data associated with network devices in a network to identify paths between source endpoints and destination endpoints and establish an inventory of enforcement points that may be used to generate a chain of enforcement points having capabilities to enforce individual operations of an intent-based security policy associated with an entity accessing a resource. The method includes receiving data representing an intent-based security policy associated with a network. In some examples, the intent-based security policy may indicate an entity, a resource, and an authorization associated with the entity accessing the resource. Additionally, or alternatively, the method includes determining a path of network traffic between the entity and the resource based at least in part on the authorization. In some examples, the path of network traffic may include one or more network devices. Additionally, or alternatively, the method includes identifying, by a Software-Defined Networking (SDN) controller associated with the network and based at least in part on an inventory storing information associated with the network devices, one or more enforcement points associated with the path of network traffic. Additionally, or alternatively, the method includes determining that a first enforcement point of the one or more enforcement points associated with the path of network traffic has a first capability to implement at least a first portion of the intent-based security policy. Additionally, or alternatively, the method includes determining that a second enforcement point of the one or more enforcement points associated with the path of network traffic has a second capability to implement at least a second portion of the intent-based security policy. Additionally, or alternatively, the method includes generating a first chain of enforcement points based at least in part on the first enforcement point and the second enforcement point. Additionally, or alternatively, the method includes sending the first portion of the intent-based policy and the second portion of the intent-based policy to the first chain of enforcement points.

Additionally, or alternatively, the method includes receiving data representing an intent-based security policy associated with a network. In some examples, the intent-based security policy may indicate an entity, a resource, and/or an authorization associated with the entity accessing the resource. Additionally, or alternatively, the method includes determining a path of network traffic between the entity and the resource based at least in part on the authorization. In some examples, the path of network traffic may include one or more network devices. Additionally, or alternatively, the method includes identifying, by a Software-Defined Networking (SDN) controller and based at least in part on an inventory storing information associated with the network devices, one or more enforcement points associated with the path of network traffic. Additionally, or alternatively, the method includes mapping an operation of one or more operations associated with the intent-based security policy to an enforcement point of the one or more enforcement points having a capability to implement the operation of the intent-based security policy. Additionally, or alternatively, the method includes generating a first chain of enforcement points based at least in part on mapping the one or more operations of the intent-based security policy to the one or more enforcement points. Additionally, or alternatively, the method includes sending the one or more operations of the intent-based policy to the one or more enforcement points associated with the first chain of enforcement points.

Additionally, or alternatively, the method includes receiving log data from network devices of a network. In some examples, the log data may indicate events occurring with respect to network traffic at the network devices in the network. Additionally, or alternatively, the method includes determining, based at least in part on the log data, a plurality of data paths associated with the network devices in the network through which a plurality of source endpoints can communicate with a plurality of destination endpoints. Additionally, or alternatively, the method includes receiving indications of roles associated with the network devices in the network and/or logical network relationships of the network devices in the network. Additionally, or alternatively, the method includes generating an inventory of enforcement points at which to apply an intent-based security policy to the network traffic. In some examples, the inventory of enforcement points may comprise groupings of the network devices based at least in part on the logical network relationships of the network devices. Additionally, or alternatively, the method includes mapping the roles associated with the network devices to the inventory of enforcement points. Additionally, or alternatively, the method includes generating a logical topology of the network indicating the data paths and the enforcement points associated with the data paths based at least in part on the mapping of the roles.

Additionally, the techniques described herein may be performed by a system and/or device having non-transitory computer-readable media storing computer-executable instructions that, when executed by one or more processors, performs the method described above.

Example Embodiments

This disclosure describes techniques for a network controller (e.g., a software-defined networking (SDN) controller) associated with a computing resource network (e.g., a cloud computing network) to generate an inventory of enforcement points (e.g., network devices having specific capabilities) using network data collected from network devices in the computing resource network and utilize the inventory of enforcement points to map roles of the network devices to the inventory of enforcement points and/or generate a logical network topology of the computing resource network. Additionally, the network controller may be configured to receive intent-based security policies associated with an entity accessing a resource (e.g., a cloud-based service, an endpoint, an application, or the like) and map the policies (or portions thereof) to enforcement points having capabilities to implement the operations associated with the policies along a path of network traffic between a source endpoint and a destination endpoint. By mapping the roles of the network devices to the inventory of enforcement points, the network controller may consider various enforcement points along a path of network traffic and intelligently determine how to split the intent-based security policy and determine a chain of enforcement points along the path of network traffic to distribute portions (or operations) of the policy to the enforcement points in the chain of enforcement points having capabilities to implement the operations required by the portion of the policy. In this way, the network controller may automatically discover application and/or user placement for policy authoring purposes, specifically assisting in identifying the chain of enforcement points in a given topology, mapping specific policy elements to each network devices capabilities, and then rendering the policy across the series of network devices in an optimal manner.

As mentioned above, the network controller may generate the inventory of enforcement points using network data collected from network devices in a network. For example, the network controller may receive log data from the network devices. The log data collected by the network controller may indicate events (e.g., firewall events, intrusion prevention system (IPS) events, netflow events, and/or any kind of workload application-source telemetry) occurring with respect to network traffic at the network devices in the network. The log data may provide indications as to where enforcement points are provisioned with respect to network traffic being observed. For example, the network controller may utilize the log data to determine a plurality of data paths associated with the network devices in the network through which a plurality of source endpoints may communicate with a plurality of destination endpoints. The network controller may further receive role tags indicative of roles associated with the network devices in the network and/or location tags indicative of logical network relationships of the network devices in the network. For example, the role tags may indicate that a network device is configured as a campus edge firewall device, a virtual private network (VPN) termination device, a branch edge device, a data center edge device, a campus internal device, and/or the like. In some examples, one or more role tags and/or a custom role tag may be applied to a network device. The location tags may indicate a physical location associated with a network device. In some examples, the physical locations indicated by the location tags may be hierarchical in that a first location indicated by a first location tag may represent a headquarters and a second location indicated by a second location tag may represent a building or a room within the headquarters.

The network controller may generate the inventory of enforcement points based on the logical network relationships of the network devices and/or the log data and may map the roles associated with the network devices to the inventory of enforcement points. The network controller may further be configured to update, or otherwise generate a new inventory of enforcement points, in response to a network device coming online, a network device going offline, new log data (e.g., indicating poor performance, new capabilities, improper functioning of a network device, etc.), and/or user input (e.g., provisioning new devices, removing provisioned devices, reconfiguring network devices, etc.). Additionally, or alternatively, the network controller may generate a logical topology of the network indicating the data paths through which the plurality of source endpoints may communicate with the plurality of destination endpoints and the enforcement points associated with the data paths. This may be achieved by mapping the roles of the network devices to the inventory of enforcement devices, as described in more detail below: In some examples, the logical topology of the network may be displayed on a computing device.

Take, for example, a portion of a network comprising four networking devices. The network controller may determine, based on the log data and/or the role tags, that the four network devices are enforcement points in the network. Additionally, the network controller may determine, based on the role tags and/or the location tags, logical network relationships between the four network devices (configured as enforcement points). For example, a first device may be associated with a first location tag and/or a first role tag indicating that the first device is an edge device and/or a VPN headend device provisioned at a main headquarters: a second device may be associated with a second role tag and/or a second location tag indicating that the second device is provisioned as a firewall device at the first datacenter of the main headquarters: a third device may be associated with a third role tag and/or a third location tag indicating that the third device is provisioned as a firewall device at the second datacenter of the main headquarters; and/or a fourth device may be associated with a fourth role tag and/or a fourth location tag indicating that the fourth device is provisioned as an edge device and/or a VPN client device provisioned at a remote branch associated with the main headquarters. In such an example, the network controller may infer that the main headquarters encompasses the first datacenter and the second datacenter, and as such, the second and third devices are associated with the first device. Additionally, or alternatively, the network controller may determine that the remote branch is associated with the main headquarters and that the VPN client is configured to connect to the VPN headend, and as such, may infer connectivity between the first device and the fourth device. These example determinations may be utilized by the network controller to generate the logical topology of a network. Additionally, or alternatively, these example determinations may be utilized to determine relative positioning of each of the enforcement points in a network with respect to a destination endpoint and a source endpoint associated with a policy and/or with respect to each other.

The logical topology of the network may be displayed on a graphical user interface (GUI) associated with a computing device. Further, the GUI may be configured to receive user input to further configure the logical topology of the network. In some examples, a user may provide input data representing a role tag, a location tag, and/or a connection between network devices. For example, a user may draw a line connecting a first device to a second device inferring a new connection between the two devices. In response to the input data, the network controller may generate a new logical topology of the network to reflect the connection between the first network device and the second network device.

As described above, the network controller may also be configured to map intent-based security policies associated with an entity accessing a resource to enforcement points having capabilities to implement operations associated with the policies along a path of network traffic between a source endpoint associated with the entity and a destination endpoint associated with the resource. In some examples, the intent-based security policy may be configured to implement various operations along path(s) of network traffic between source endpoints and destination endpoints, such as, for example, intrusion prevention system (IPS) operations, application security operations, web application firewall operations, denial of service attack prevention operations, uniform resource locator (URL) filtering and categorization operations, application programming interface (API) inspection operations, malware protection operations, firewall operations, and the like. Additionally, or alternatively, the source endpoint associated with the entity may be configured as a private application, a remote user, a branch user, and/or the like. Additionally, or alternatively, the destination endpoint associated with the resource may be configured as a datacenter private application, a private application in a public cloud, a software as a service (SaaS) application, and/or the like. For example, the network controller may receive an intent-based security policy associated with a network. The intent-based security policy may indicate an entity, a resource, and/or an authorization associated with the entity accessing the resource (e.g., how this entity is authorized to access the resource across a given managed network). The network controller may then determine a path of network traffic including one or more network devices between the entity and the resource based on the authorization. In some examples, the network controller may determine multiple paths of network traffic between the entity and the resource. The network controller may also identify one or more enforcement points associated with the path(s) of network traffic. For example, the network controller may utilize the inventory of enforcement points to identify enforcement points provisioned along the path(s) of network traffic.

The network controller may be configured to intelligently render the intent-based security policy across the enforcement points along the path(s) of network traffic. Take, for example, an intent-based security policy configured to enforce a first operation and a second operation along a path of network traffic. In such an example, the network controller may determine that a first enforcement point associated with the path of network traffic has a first capability to implement at least the first operation associated with the intent-based security policy and that a second enforcement point associated with the path of network traffic has a second capability to implement at least the second operation associated with the intent-based security policy. As such, the network controller may generate a chain of enforcement points including the first enforcement point and the second enforcement point. Once the chain of enforcement points has been generated, the network controller may render the policy across the network to the enforcement points. For example, the network controller may send a first portion of the intent-based security policy configured to enforce the first operation to the first enforcement point and a second portion of the intent-based security policy configured to enforce the second operation to the second enforcement point.

In some examples, the network controller may generate the chain of enforcement points from among multiple candidate enforcement points. For example, an intent-based security policy may require a first capability to perform an operation associated with the policy, and a first enforcement point and a second enforcement point may both have the first capability and be provisioned along a path of network traffic between a destination endpoint and a source endpoint associated with the policy. In some examples, the network controller may generate a chain of enforcement points including the first enforcement point and not the second enforcement point based on determining that the first enforcement point has more favorable performance metrics (e.g., bandwidth, current usage, more robust capabilities for a portion of the policy, etc.) than the second enforcement. Additionally, or alternatively, the network controller may determine to utilize the first enforcement point rather than the second enforcement point based on a number of connections associated with the enforcement points, location of the enforcement points, software associated with the enforcement points, and the like. Additionally, the network controller may generate recommendations for rendering the intent-based security policy through the network. For example, the network controller may recommend placement optimizations associated with the policy (e.g., placing a portion of the policy at a common upstream intersection point rather than duplicate it across multiple downstream paths) and/or performance optimizations (e.g., provision a more compact/coarse policy at an edge firewall and distribute workload-specific rules across application-specific level controls). In some examples, a destination endpoint and/or a source endpoint executing a private application may be configured as an enforcement point having capabilities to implement portions of the intent-based security policies.

Further, workload agents may be executing on the enforcement points, the source endpoints, and/or the destination endpoints and may collect application vulnerability information associated with a resource that may be accessed by an entity. The workload agents may send such application vulnerability information to the network controller for further processing. In some examples, the network control may be configured to apply virtual patching capabilities on a downstream enforcement point having IPS capabilities based on such application vulnerability information indicating that a workload component may not be able to prevent an attack. In this way, a vulnerable application resource may remain available to entities in the network while avoiding exposure. Additionally, or alternatively, the network controller may process the application vulnerability information and generate a tailored IPS policy at an edge of a network, such as, for example, on an edge firewall device, for frontend application protection.

A user configuring such a network may access one or more GUIs configured to display the logical topology of the network, the intent-based security policy rendered onto the network, receive user input, and the like. As previously described, a user may provide inputs to the network controller to modify the configurations of the enforcement points and/or other network devices, and/or to provide insight as to how the network controller should split intent-based security policies between the enforcement points.

As described herein, a computing-based, cloud-based solution and/or service generally include any type of resources implemented by virtualization techniques, such as containers, virtual machines, virtual storage, and so forth. Further, although the techniques described as being implemented in data centers and/or a cloud computing network, the techniques are generally applicable for any network of devices managed by any entity where virtual resources are provisioned. In some instances, the techniques may be performed by a schedulers or orchestrator, and in other examples, various components may be used in a system to perform the techniques described herein. The devices and components by which the techniques are performed herein are a matter of implementation, and the techniques described are not limited to any specific architecture or implementation.

The techniques described herein provide various improvements and efficiencies with respect to applying security policies and/or applying changes to security policies in a managed network. For instance, the techniques described herein may allow for automated mapping of exact paths from a source endpoint to a destination endpoint to identify any applicable enforcement point along the paths and generate an inventory of enforcement points. By utilizing log data and specialized tags associated with the network devices, a network controller can identify enforcement points along a path of network traffic and infer connectivity between enforcement points. This allows for network security operations customers having a managed network to easily identify and reconfigure enforcement points and discover application and/or user placement within a network, allowing for more efficient policy authoring. Additionally, a network controller may be leveraged to automatically render an end-to-end intent-based security policy (or a change to a policy) across a series of devices using a chain of enforcement points by leveraging the inventory of enforcement points. This allows for optimization of a policy by efficiently splitting the policy across multiple devices of a network having the required capabilities to perform operations required by the policy, efficient distribution of the policy across the multiple devices, and increased security in the network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture diagram 100 of a computing resource network 102, such as, for example, a cloud computing network including a network controller 104 configured storing a policy mapping 106 of intent-based security policies 108 mapped to enforcement points 110 having capabilities to implement operations associated with the policies along a path of network traffic between a source endpoint and a destination endpoint.

The computing resource network 102 may provide on-demand availability of computing system resources of physical server(s), such as data storage, computing power (e.g., CPU, GPU, etc.), networking, databases, etc., without direct active management by users. In some examples, the computing resource network 102 may be managed and maintained by a service provider such that users do not have to invest in and maintain the computing infrastructure for their computing resource needs. Generally, a user may be provided access to, or allocated use of, a portion of the computing resources of physical server(s) in the computing resource network 102. The computing resource network 102 may scale, such as by spinning up resources or spinning down resources, based on demand for the individual users. The portions of the computing resource network 102 may be allocated using hardware virtualization such that portions of the computing resource network 102 can be configured and managed by the user (e.g., security configuration, load balancing configuration, etc.). However, the computing resource network 102 need not be managed by a service provider, and can be managed by any entity, including the user themselves that run the applications or services.

In some examples, physical server(s) may host one or more virtual machines. Each virtual machine may be configured to execute one of various operations and act as one or more virtual components for the computing resource network 102, such as, for example, computing-based resources. In some examples, the physical server(s) may host any number of virtual machines. In some examples, physical server(s) in the computing resource network 102 may host the various network components of the computing resource network 102, such as, for example, a first enforcement point 110(1) deployed at a campus domain 112, a second enforcement point 110(2) associated with a first cloud service 114(1), a third enforcement point 110(3) deployed at a datacenter 116, a fourth enforcement point 110(N) associated with a second cloud service 114(N), and/or any other network device.

Users may interact with the computing resource network 102 via one or more user devices. The user devices may be any type of computing device capable of connecting to the computing resource network 102 via a suitable data communications network such as, but not limited to, a laptop or desktop computer, a tablet computing device, a server computer, a television, or a mobile telephone. Administrative users employed by the operator of the computing resource network 102, such as administrators managing the operation of the computing resource network 102, might also connect with, manage, and utilize resources provided by the computing resource network 102 in a similar fashion. Such administrative users may provide input data to change the network, such as, for example, input data associated with provisioning a network device, input data associated with removing a previously provisioned network device, input data representing an intent-based security policy 108, and the like.

FIG. 2 illustrates a system architecture diagram 200 of a computing resource network 102, such as, for example, a cloud computing network including a network controller 104 configured to generate an inventory of enforcement points 202 using network data 204 collected from network devices 206(1)-(N) and utilized to generate a network topology 208 of the enforcement points 110(1)-(N) using the techniques described herein. In some examples, the network devices 206(1)-(N) as illustrated in FIG. 2, may be configured as an enforcement point 110, as described with respect to FIG. 1. It should be appreciated that the computing resource network 102 is depicted differently in FIGS. 1 and 2 for clarity of examples, and that the computing resource network 102 as illustrated in FIG. 1 may be configured in the same way as the computing resource network 102 as illustrated in FIG. 2.

As previously described, the network controller 104 may be configured to generate an enforcement point inventory 202 using network data 204 collected from network devices 206 in a network 102. In some examples, the network data 204 may comprise log data, role tags, and/or location tags associated with individual network devices 206 in the network. For example, the network controller 104 may receive log data 204 from the individual network devices 206(1)-(N) in the network 102, where N may be any integer greater than 1. The network data 204 collected by the network controller 104 may indicate events (e.g., firewall events, intrusion prevention system (IPS) events, netflow events, and/or any kind of workload application-source telemetry) occurring with respect to network traffic at the network devices 206 in the network 102. The network data 204 may provide indications as to where enforcement points 110 are provisioned with respect to network traffic being observed. For example, the network controller 104 may utilize the network data 204 to determine a plurality of data paths associated with the network devices 206 in the network through which a plurality of source endpoints may communicate with a plurality of destination endpoints. The network controller 104 may further receive network data 204 representing role tags indicative of roles associated with the network devices 206 in the network 102 and/or location tags indicative of logical network relationships of the network devices 206 in the network 102. In some examples, the network data 204 representing the role tags and/or the locations tags may be configured explicitly by a user (e.g., a network administrator) and/or discovered (or received) from a third-party directory (e.g., a network device directory). For example, the role tags may indicate that a network device is configured as a campus edge firewall device, a virtual private network (VPN) termination device, a branch edge device, a data center edge device, a campus internal device, and/or the like. In some examples, one or more role tags and/or a custom role tag may be applied to a network device 206. The location tags may indicate a physical location associated with a network device 206. In some examples, the physical locations indicated by the location tags may be hierarchical in that a first location indicated by a first location tag may represent a headquarters and a second location indicated by a second location tag may represent a building or a room within the headquarters.

The network controller 104 may generate the inventory of enforcement points 202 based on the logical network relationships of the network devices 206 and/or the network data 204 and may map the roles associated with the network devices 206 to the inventory of enforcement points 202. The network controller 104 may further be configured to update, or otherwise generate a new inventory of enforcement points 202, in response to a network device 206 coming online, a network device 206 going offline, new log data 204 (e.g., indicating poor performance, new capabilities, improper functioning of a network device 206, etc.), and/or user input (e.g., provisioning new devices, removing provisioned devices, reconfiguring network devices 206, etc.). Additionally, or alternatively, the network controller 104 may generate a logical topology 208 of the network indicating the data paths through which the plurality of source endpoints may communicate with the plurality of destination endpoints and the enforcement points associated with the data paths (as shown by the dashed lines of the logical topology 208). Additionally, or alternatively, the logical topology 208 may include indications of the role tags and/or the location tags of associated network devices 206. This may be achieved by mapping the roles of the network devices 206 to the inventory of enforcement devices 202, as described in more detail below. In some examples, the logical topology 208 of the network 102 may be displayed on a computing device.

Take, for example, a portion of a network 210 comprising four networking devices 206. The network controller 104 may determine, based on the log data 204 and/or the role tags, that the four network devices 206 are enforcement points 110 in the network 102, respectively. Additionally, the network controller 104 may determine, based on the role tags and/or the location tags, logical network relationships between the four network devices 206 (configured as enforcement points 110). For example, a first network device 206(8) may be associated with a first location tag and/or a first role tag indicating that the first network device 206(8) is an edge device and/or a VPN headend device provisioned at a main headquarters 212; a second network device 206(7) may be associated with a second role tag and/or a second location tag indicating that the second network device 206(7) is provisioned as a firewall device at a first datacenter 214(1) of the main headquarters 212: a third network device 206(11) may be associated with a third role tag and/or a third location tag indicating that the third network device 206(11) is provisioned as a firewall device at a second datacenter 214(N) of the main headquarters 208; and/or a fourth network device 206(N) may be associated with a fourth role tag and/or a fourth location tag indicating that the fourth network device 206(N) is provisioned as an edge device and/or a VPN client device provisioned at a remote branch 216 associated with the main headquarters 212. In such an example, the network controller 104 may infer that the main headquarters 210 encompasses the first datacenter 214(1) and the second datacenter 214(N), and as such, the second network device 206(7) and the third network device 206(11) are associated with the first network device 206(8). Additionally, or alternatively, the network controller 104 may determine that the remote branch 216 is associated with the main headquarters 212 and that the VPN client is configured to connect to the VPN headend, and as such, may infer connectivity between the first network device 206(8) and the fourth network device 206(N). These example determinations may be utilized by the network controller 104 to generate the logical topology 208 of a network 102. Additionally, or alternatively, these example determinations may be utilized to determine relative positioning of each of the network devices 206 in a network with respect to a destination endpoint and a source endpoint associated with a policy and/or with respect to each other.

The logical topology 208 of the network may be displayed on a graphical user interface (GUI) associated with a computing device. Further, the GUI may be configured to receive user input to further configure the logical topology 208 of the network. In some examples, a user may provide input data representing a role tag, a location tag, and/or a connection between network devices 206. For example, a user may draw a line connecting a first network device 206(8) to a fifth network device 206(4) inferring a new connection between the two devices 206. In response to the input data, the network controller 104 may generate a new logical topology 208 of the network to reflect the connection between the first network device 206(8) and the fifth network device 206(4).

Referring back to FIG. 1, the network controller 104 may also be configured to map intent-based security policies 108 associated with an entity accessing a resource to enforcement points 110 having capabilities to implement operations (e.g., see policy mapping 106) associated with the policies 108 along a path of network traffic between a source endpoint associated with the entity (e.g., user 118 in a campus domain 112) and a destination endpoint associated with the resource (e.g., an application backend 120 executing as a cloud service 114(N)). In some examples, the intent-based security policy 108 may be configured to implement various operations along path(s) of network traffic between source endpoints and destination endpoints, such as, for example, intrusion prevention system (IPS) operations, malware protection operations, firewall operations, and the like. Additionally, or alternatively, the source endpoint associated with the entity may be configured as a private application, a remote user accessing a resource via the internet 124, a branch user, and/or the like. Additionally, or alternatively, the destination endpoint associated with the resource may be configured as a datacenter private application, a private application, a software as a service (SaaS) application, and/or the like. For example, the network controller 104 may receive an intent-based security policy 108 associated with a network 102. The intent-based security policy 108 may indicate an entity (e.g., the user 118 in the campus domain 112), a resource (e.g., the application backend 120(2) offered as a cloud service 114(N)), and/or an authorization associated with the entity 118 accessing the resource 120(2) (e.g., how this entity 118 is authorized to access the resource 120(2) across a given managed network). The network controller 104 may then determine a path of network traffic including one or more network devices 110 between the entity 118 and the resource 120(2) based on the authorization.

In some examples, the network controller 104 may determine multiple paths of network traffic between the entity 118 and the resource 120(2). For example, the network controller 104 may determine that the entity 118 is at a campus domain 112 and is accessing an application back end 120(2) resource offered as a cloud service 114(N). As illustrated, the user 118 may access to the application backend 120(2) resource via an application front end 122 hosted as a cloud service 114(1), which may utilize a datacenter 116 as an application backend 120(1) storing data for the resource to provide the application backend resource 120(2) as a cloud service 114(N) to the user 118. Such a connection may be further described with respect to the legend 126 indicating application to application based connections and user to application based connections along the path of network traffic. The network controller 104 may also identify one or more enforcement points 110 associated with the path(s) of network traffic. For example, the network controller 104 may utilize the inventory of enforcement points 202 including the policy mapping 106 to identify enforcement points 110 provisioned along the path(s) of network traffic. For example, the network controller 104 may identify a first enforcement point 110(1) associated with the campus domain 112, a second enforcement point 110(2) associated with the cloud service 114(1) providing the application front end 122, a third enforcement point 110(3) associated with the data center 116 storing data associated with the application back end 120(1), and/or a fourth enforcement point 110(N) associated with the cloud service 114(N) providing the application back end 120(2).

The network controller 104 may be configured to intelligently render the intent-based security policy 108 across the enforcement points 110 along the path(s) of network traffic. Take, for example, an intent-based security policy 108 configured to enforce a first operation, a second operation, a third operation, and a fourth operation along a path of network traffic. In such an example, the network controller 104 may determine that a first enforcement point 110(1) associated with the path of network traffic has a first capability to implement at least the first operation associated with the intent-based security policy 108, a second enforcement point 110(2) associated with the path of network traffic has a fourth capability to implement at least the fourth operation associated with the intent-based security policy 108, a third enforcement point 110(3) associated with the path of network traffic has a third capability to implement at least the third operation associated with the intent-based security policy 108, and a fourth enforcement point 110(N) associated with the path of network traffic has a second capability to implement at least the second operation associated with the intent-based security policy 108 and may map the capabilities to the respective enforcement points 110, as shown by the policy mapping 106. As such, the network controller 104 may generate a chain of enforcement points including the first enforcement point 110(1), the second enforcement point 110(2), the third enforcement point 110 (3), and the fourth enforcement point 110(N). Once the chain of enforcement points has been generated, the network controller 104 may render the policy across the network 102 to the enforcement points 110. For example, the network controller 104 may send a first portion of the intent-based security policy 108 configured to enforce the first operation to the first enforcement point 110(1), a second portion of the intent-based security policy 108 configured to enforce the second operation to the fourth enforcement point 110(N), a third portion of the intent-based security policy 108 configured to enforce the third operation to the third enforcement point 110(3), and a fourth portion of the intent-based security policy 108 configured to enforce the fourth operation to the second enforcement point 110(2).

In some examples, the network controller 104 may generate the chain of enforcement points from among multiple candidate enforcement points 110. For example, an intent-based security policy 108 may require a first capability to perform a first operation associated with the policy 108, and a first enforcement point 110(1) and a second enforcement point 110(2) may both have the first capability and be provisioned along a path of network traffic between a destination endpoint and a source endpoint associated with the policy 108. In some examples, the network controller 104 may generate a chain of enforcement points including the first enforcement point 110(1) and not the second enforcement point 110(2) based on determining that the first enforcement point 110(1) has more favorable performance metrics (e.g., bandwidth, current usage, more robust capabilities for a portion of the policy, etc.) than the second enforcement point 110(2). Additionally, or alternatively, the network controller 104 may determine that the second enforcement point 110(2) is already configured to implement a second portion of the intent-based security policy 108 and may determine to have the first enforcement point 110(1) implement the first portion of the intent-based security policy 108 for load balancing purposes. Additionally, or alternatively, the network controller 104 may determine to send the first portion of the intent-based security policy 108 to the second enforcement point 110(2) even though the second enforcement point 110(2) is already implementing the second portion of the intent-based security policy 108 to reduce a number of hops for network traffic along such a path. Additionally, or alternatively, the network controller 104 may determine to utilize the first enforcement point 110(1) rather than the second enforcement point 110(2) based on a number of connections associated with the enforcement points 110, location of the enforcement points 110, software associated with the enforcement points 110, and the like.

The network controller 104 may also generate recommendations for rendering the intent-based security policy 108 through the network 102. For example, the network controller 104 may recommend placement optimizations associated with the policy 108 (e.g., placing a portion of the policy at a common upstream intersection point rather than duplicate it across multiple downstream paths) and/or performance optimizations (e.g., provision a more compact/coarse policy at an edge firewall and distribute workload-specific rules across application-specific level controls).

Further, workload agents may be executing on the enforcement points 110, the source endpoints, and/or the destination endpoints and may collect application vulnerability information associated with a resource that may be accessed by an entity. The workload agents may send such application vulnerability information to the network controller 104 for further processing. In some examples, the network controller 104 may be configured to apply virtual patching capabilities on a downstream enforcement point 110 (e.g., enforcement point 110(N)) having IPS capabilities based on such application vulnerability information indicating that a workload component may not be able to prevent an attack. In this way, a vulnerable application resource may remain available to entities in the network 102 while avoiding exposure. Additionally, or alternatively, the network controller 104 may process the application vulnerability information and generate a tailored IPS policy 108 at an edge of a network 102, such as, for example, on an edge firewall device, for frontend application protection.

A user configuring such a network may access one or more GUIs configured to display the logical topology of the network 208, the intent-based security policy rendered onto the network, receive user input, and the like. As previously described, a user may provide inputs to the network controller 104 to modify the configurations of the enforcement points 110 and/or other network devices, and/or to provide insight as to how the network controller 104 should split intent-based security policies 108 between the enforcement points 110.

Figure 3A:
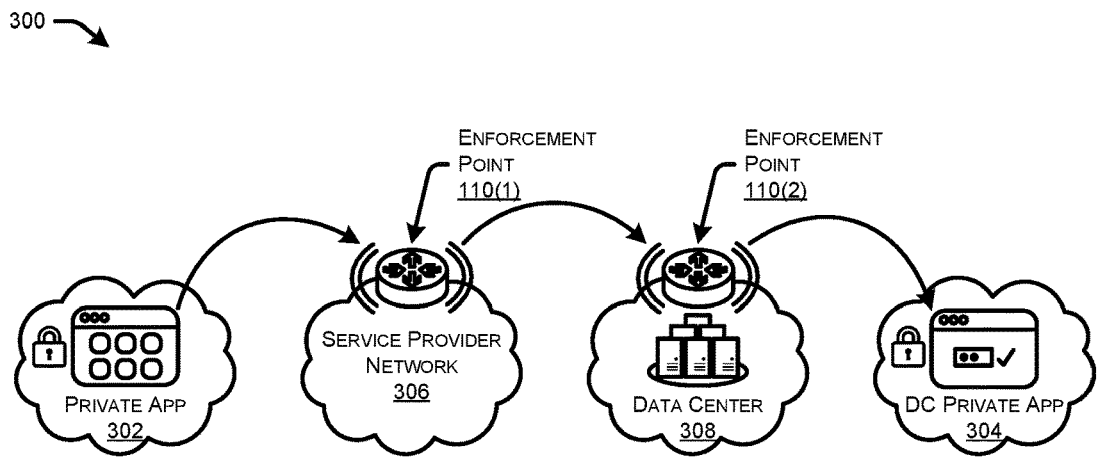
FIGS. 3A-3C illustrate diagrams of example chains of enforcement points for implementing an end-to-end security policy in a computing resource network according to the techniques described herein.
Figure 3B:
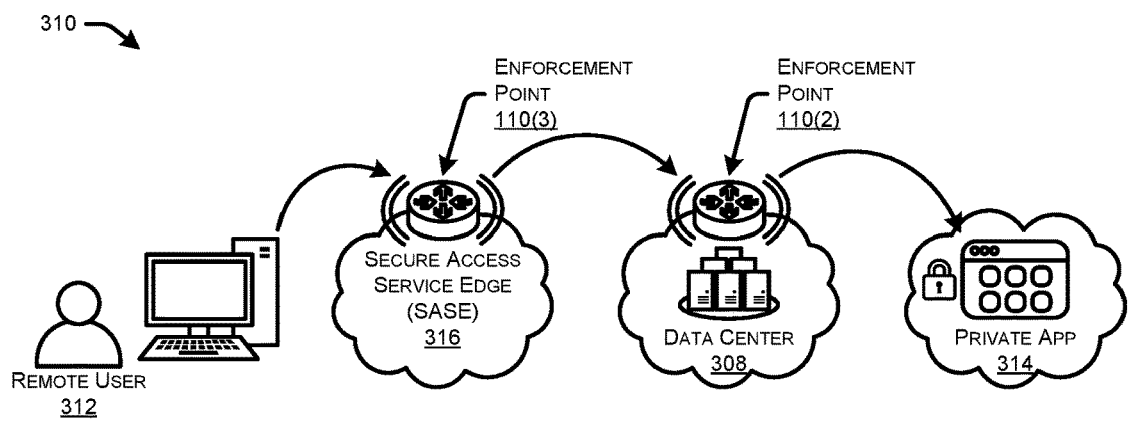
Figure 3C:
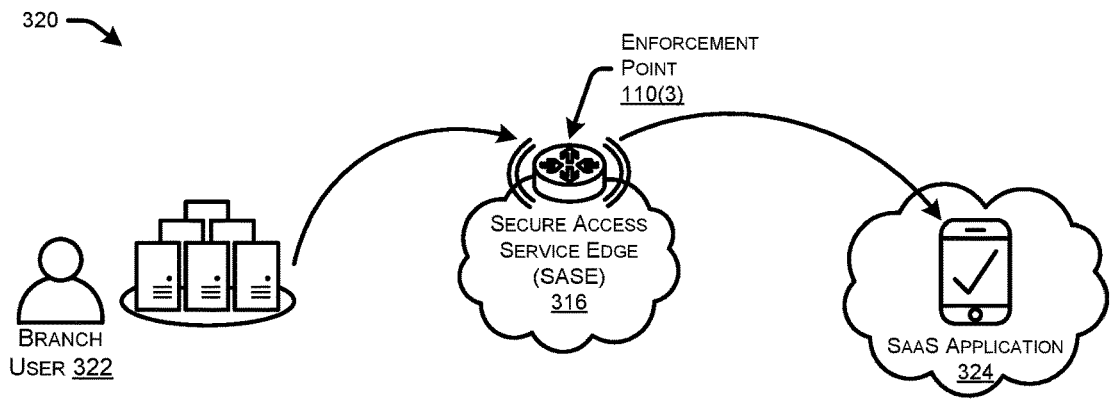

FIGS. 3A-3C illustrate diagrams of example chains of enforcement points 300, 310, 320 for implementing an end-to-end security policy in a computing resource network 102 according to the techniques described herein. Each of FIGS. 3A-3C provide example scenarios for implementing security policies in networks having different configurations.

FIG. 3A illustrates a diagram of a first example chain of enforcement points 300 for implementing an end-to-end security policy associated with an entity accessing a resource in a computing resource network 102. The policy may be a first policy associated with a source endpoint (e.g., a private application 302) accessing a destination endpoint (e.g., a datacenter private application 304). A network controller 104 associated with the network may determine one or more paths across network devices from the source endpoint 302 to the destination endpoint 304. Additionally, or alternatively, the network controller 104 may determine that the first policy includes a first operation that requires an enforcement point 110 having a first capability to enforce the first operation and a second operation that requires an enforcement point 110 having a second capability to enforce the second operation on network traffic. Here, the network controller 104 may identify a first enforcement point 110(1) associated with a service provider network 306 having the first capability and a second enforcement point 110(2) associated with a data center 308 having the second capability.

The network controller 104 may then generate the chain of enforcement points 300 including the first enforcement point 110(1) and the second enforcement point 110(2) and distribute respective portions (or operations) of the policy to the corresponding enforcement points 110 based on the chain of enforcement points 300. In this way, the first enforcement point 110(1) may perform the first operation of the policy on network traffic between the source endpoint 302 and the destination endpoint 304 and the second enforcement point 110(2) may perform the second operation of the policy on network traffic between the source endpoint 302 and the destination endpoint 304.

FIG. 3B illustrates a diagram of a second example chain of enforcement points 310 for implementing an end-to-end security policy associated with an entity accessing a resource in a computing resource network 102. The policy may be a second policy associated with a source endpoint (e.g., a remote user 312) accessing a destination endpoint (e.g., a private application 314). A network controller 104 associated with the network may determine one or more paths across network devices from the source endpoint 312 to the destination endpoint 314. Additionally, or alternatively, the network controller 104 may determine that the second policy includes a third operation that requires an enforcement point 110 having a third capability to enforce the third operation and a second operation that requires an enforcement point 110 having a second capability to enforce the second operation on network traffic. Here, the network controller 104 may identify a third enforcement point 110(3) associated with a secure access service edge (SASE) 316 having the third capability and a second enforcement point 110(2) associated with a data center 308 having the second capability.

The network controller 104 may then generate the chain of enforcement points 310 including the third enforcement point 110(3) and the second enforcement point 110(2) and distribute respective portions (or operations) of the policy to the corresponding enforcement points 110 based on the chain of enforcement points 310. In this way, the third enforcement point 110(3) may perform the first operation of the policy on network traffic between the source endpoint 312 and the destination endpoint 314 and the second enforcement point 110(2) may perform the second operation of the policy on network traffic between the source endpoint 312 and the destination endpoint 314.

FIG. 3C illustrates a diagram of a third example chain of enforcement points 320 for implementing an end-to-end security policy associated with an entity accessing a resource in a computing resource network 102. The policy may be a third policy associated with a source endpoint (e.g., a branch user 322) accessing a destination endpoint (e.g., a SaaS application 324). A network controller 104 associated with the network may determine one or more paths across network devices from the source endpoint 322 to the destination endpoint 324. Additionally, or alternatively, the network controller 104 may determine that the third policy includes a fourth operation that requires an enforcement point 110 having a fourth capability to enforce the fourth operation and/or a fifth operation that requires an enforcement point 110 having a fifth capability to enforce the fifth operation on network traffic. Here, the network controller 104 may identify a third enforcement point 110(3) associated with a SASE 316 having the fourth capability and the fifth capability.

The network controller 104 may then generate the chain of enforcement points 320 including the third enforcement point 110(3) and distribute respective portions (or operations) of the policy to the corresponding enforcement points 110 based on the chain of enforcement points 320. In this way, the third enforcement point 110(3) may perform both the fourth operation and the fifth operation of the policy on network traffic between the source endpoint 322 and the destination endpoint 324.

FIG. 4 illustrates an example diagram 400 depicting different chains of enforcement points for implementing an end-to-end security policy associated with an entity in a computing resource network according to the techniques described herein. In some examples, one or more intent-based security policies may be associated with the entity and may be configured for various source endpoints, such as, for example, the branch A user 402(1), the branch B user 402(2), and/or the remote user 404, accessing a single destination endpoint, such as, for example a SaaS application 406.

A network controller 104 may receive an intent-based security policy (or multiple variations of such a policy for multiple configurations of users) configured to implement various operations on network traffic between source endpoints 402(1), 402(2), 404 and a destination endpoint, such as, the SaaS application 406. For example, an entity may have users accessing the SaaS application 406 from a first branch 402(1), a second branch 402(2), and/or from a remote location 404. As such, the network controller 104 may determine a first chain of enforcement points for a branch A user 402(1) accessing the SaaS application 406 including a first enforcement point 110(1) provisioned at a branch A data center 408(1) having the required capabilities to perform respective operations of the policy. The network controller 104 may distribute the policy (or portions thereof) to the enforcement point(s) 110(1) included in the first chain of enforcement points, where the operations may be performed on the network traffic between the source endpoint 402(1) and the SaaS application 406.

Additionally, or alternatively, the network controller 104 may determine a second chain of enforcement points for a branch B user 402(2) accessing the SaaS application 406 including a second enforcement point 110(2) provisioned at a branch B data center 408(2) having the required capabilities to perform respective operations of the policy. The network controller 104 may distribute the policy (or portions thereof) to the enforcement point(s) 110(2) included in the second chain of enforcement points, where the operations may be performed on the network traffic between the source endpoint 402(2) and the SaaS application 406.

Additionally, or alternatively, the network controller 104 may determine a third chain of enforcement points for a remote user 404 accessing the SaaS application 406 including a third enforcement point 110(3) associated with a SASE 410 having the required capabilities to perform respective operations of the policy. The network controller 104 may distribute the policy (or portions thereof) to the enforcement point(s) 110(3) included in the third chain of enforcement points, where the operations may be performed on the network traffic between the source endpoint 404 and the SaaS application 406.

With such a configuration, a network controller 104 may be configured to receive a single intent-based security policy associated with an entity and generate respective chains of enforcement points indicating where to render the intent-based security policy along various paths of network traffic between separate source endpoints and a single destination endpoint.

FIGS. 5-8 illustrate flow diagrams of example methods 500-800 and that illustrate aspects of the functions performed at least partly by the computing resource network 102, the network controller 104, and/or the enforcement point(s) 110 as described in FIGS. 1 and 2. The logical operations described herein with respect to FIGS. 5-8 may be implemented (1) as a sequence of computer-implemented acts or program modules running on a computing system and/or (2) as interconnected machine logic circuits or circuit modules within the computing system. In some examples, the method(s) 500-800 may be performed by a system comprising one or more processors and one or more non-transitory computer-readable media storing computer-executable instructions that, when executed by the one or more processors, cause the one or more processors to perform the method(s) 500-800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
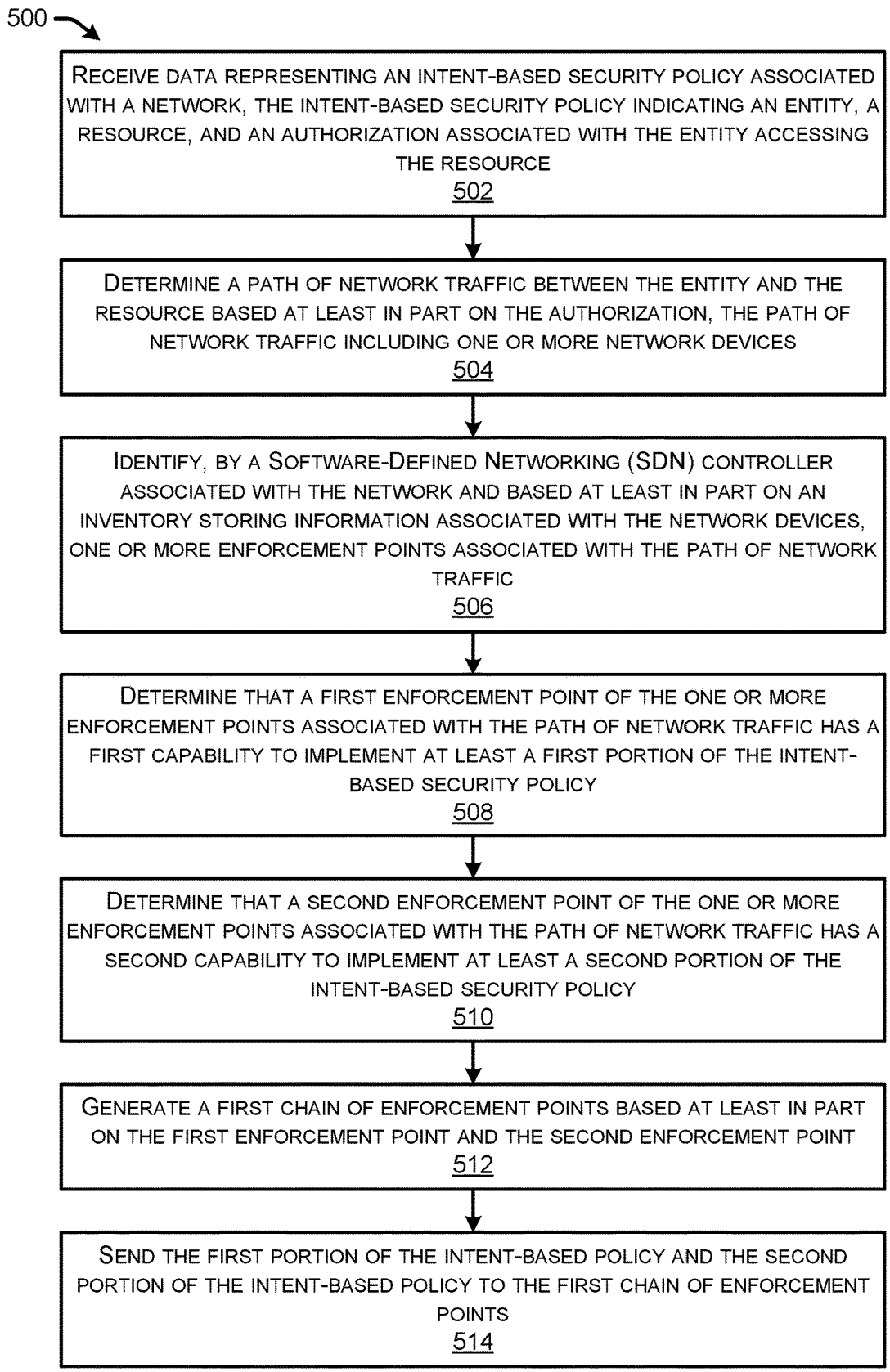
FIG. 5 illustrates a flow diagram of an example method for a network controller to receive intent-based security policies associated with an entity accessing a resource and map the policies to enforcement points having capabilities to implement operations associated with the policies along a path of network traffic between a source endpoint and a destination endpoint.

FIG. 5 illustrates a flow diagram of an example method 500 for a network controller associated with a managed network to receive intent-based security policies associated with an entity accessing a resource and map the policies to enforcement points having capabilities to implement operations associated with the policies along a path of network traffic between a source endpoint and a destination endpoint. In some examples, the managed network, the network controller, the intent-based security policies, the source endpoint and/or the destination endpoint may be configured as the computing resource network 102, the network controller 104, the intent-based security policy 108, the user 118, and/or the application backend 120(2) as described with respect to FIG. 1.

At 502, the method 500 includes receiving data representing an intent-based security policy associated with a network. In some examples, the intent-based security policy may indicate an entity, a resource, and/or an authorization associated with the entity accessing the resource.

At 504, the method 500 includes determining a path of network traffic between the entity and the resource based at least in part on the authorization. In some examples, the path of network traffic may include one or more network devices.

At 506, the method 500 includes identifying one or more enforcement points associated with the path of network traffic. In some examples, a Software-Defined Networking (SDN) controller associated with the network may be configured to identify the one or more enforcement points associated with the path of network traffic. Additionally, or alternatively, the SDN controller may identify the one or more enforcement points based at least in part on an inventory storing information associated with the network devices.

At 508, the method 500 includes determining that a first enforcement point of the one or more enforcement points associated with the path of network traffic has a first capability to implement at least a first portion of the intent-based security policy.

At 510, the method 500 includes determining that a second enforcement point of the one or more enforcement points associated with the path of network traffic has a second capability to implement at least a second portion of the intent-based security policy. In some examples, the second capability may be different from the first capability. Additionally, or alternatively, the second portion of the intent-based security policy may be different from the first portion of the intent-based security policy.

At 512, the method 500 includes generating a first chain of enforcement points based at least in part on the first enforcement point and the second enforcement point.

At 514, the method 500 includes sending the first portion of the intent-based policy and/or the second portion of the intent-based policy to the first chain of enforcement points. In some examples, the first portion of the intent-based security policy may be sent to the first enforcement point included in the chain of enforcement points. Additionally, or alternatively, the second portion of the intent-based security policy may be sent to the second enforcement point included in the chain of enforcement points.

Additionally, or alternatively, the method 500 may include determining that a third enforcement point of the one or more enforcement points associated with the path of network traffic has the first capability to implement at least the first portion of the intent-based security policy. Additionally, or alternatively, the method 500 may include determining that a fourth enforcement point of the one or more enforcement points associated with the path of network traffic has the second capability to implement at least the second portion of the intent-based security policy. Additionally, or alternatively, the method 500 may include generating a second chain of enforcement points based at least in part on the third enforcement point and the fourth enforcement point. Additionally, or alternatively, the method 500 may include determining that first performance metrics associated with the first chain of enforcement points is more favorable than second performance metrics associated with the second chain of enforcement points. In some examples, sending the first portion of the intent-based policy and/or the second portion of the intent-based policy to the first chain of enforcement points may be based at least in part on determining that the first performance metrics are more favorable than the second performance metrics.

Additionally, or alternatively, the method 500 may include identifying, at the SDN controller and from a workload agent associated with the resource, application vulnerability information associated with the resource. Additionally, or alternatively, the method 500 may include determining that an intrusion prevention capability is required to access the resource based at least in part on the application vulnerability information. In some examples, generating the first chain of enforcement points may be further based at least in part on determining that one of the first enforcement point and/or the second enforcement point has the intrusion prevention capability.

In some examples, the first capability may comprise at least one of an intrusion prevention capability, a malware protection capability, and/or a firewall capability.

Additionally, or alternatively, the method 500 may include generating a logical topology of the network including the path of network traffic and the first chain of enforcement points. Additionally, or alternatively, the method 500 may include generating a graphical user interface (GUI) configured to display on a computing device. In some examples, the GUI may include the logical topology of the network.

In some examples, the GUI may be further configured to receive an input from the computing device. Additionally, or alternatively, the method 500 may include receiving, via the GUI, input data representing the input configured to modify the first chain of enforcement points. Additionally, or alternatively, the method 500 may include generating, based at least in part on the input data, a second chain of enforcement points.

In some examples, the input configured to modify the first chain of enforcement points comprises at least one of a first input configured to add a new enforcement point to the one or more enforcement points of the network, a second input configured to remove an enforcement point of the one or more enforcement points from the network, a third input configured to modify a configuration of one or more of the enforcement points associated with the path of network traffic, and/or a fourth input configured to modify the intent-based security policy.

Figure 6:
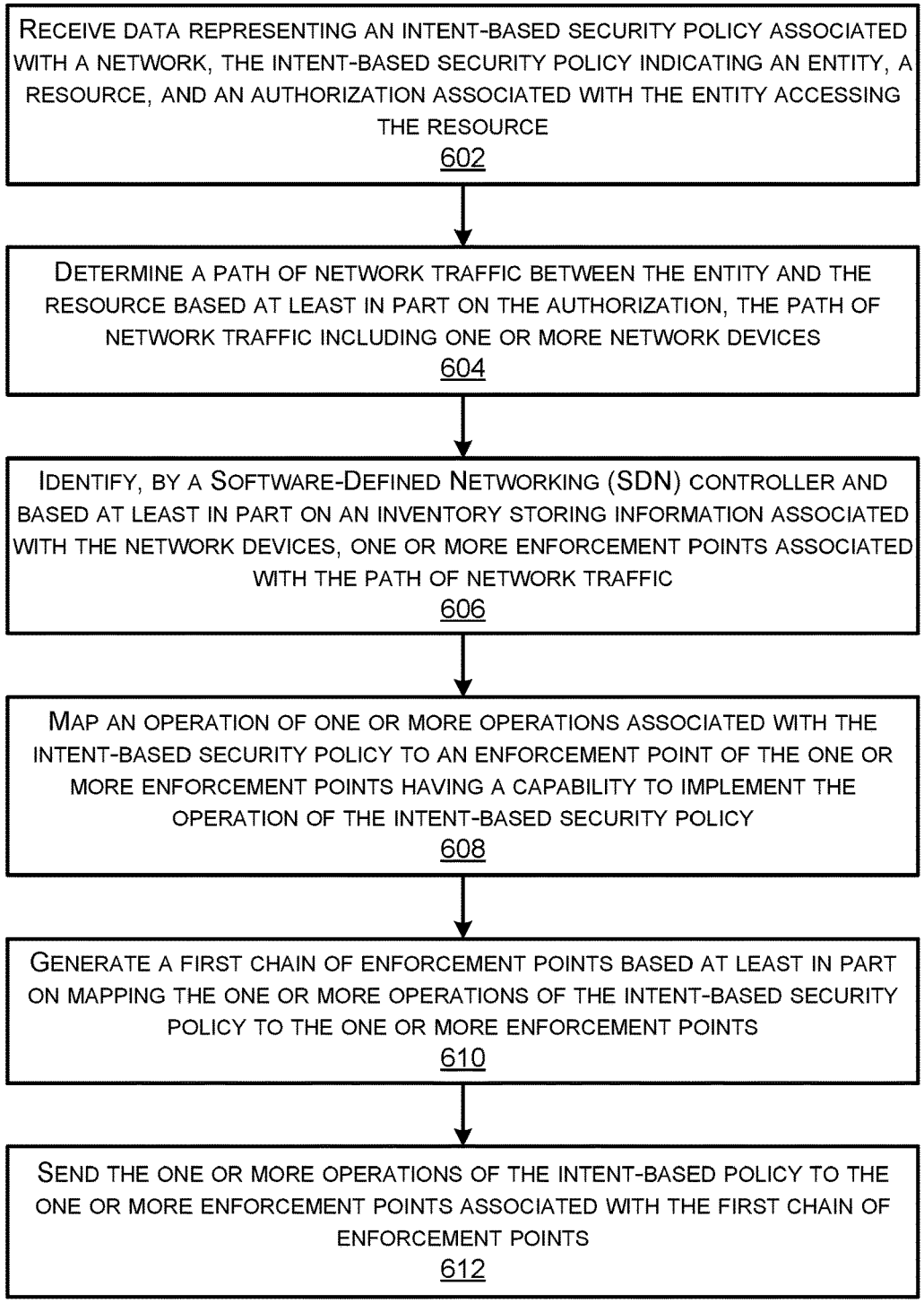
FIG. 6 illustrates a flow diagram of another example method for a network controller to receive intent-based security policies associated with an entity accessing a resource and map the policies to enforcement points having capabilities to implement operations associated with the policies along a path of network traffic between a source endpoint and a destination endpoint.

FIG. 6 illustrates a flow diagram of an example method 600 for a network controller associated with a managed network to receive intent-based security policies associated with an entity accessing a resource and map the policies to enforcement points having capabilities to implement operations associated with the policies along a path of network traffic between a source endpoint and a destination endpoint. In some examples, the managed network, the network controller, the intent-based security policies, the source endpoint and/or the destination endpoint may be configured as the computing resource network 102, the network controller 104, the intent-based security policy 108, the user 118, and/or the application backend 120(2) as described with respect to FIG. 1.

At 602, the method 600 includes receiving data representing an intent-based security policy associated with a network. In some examples, the intent-based security policy may indicate an entity, a resource, and/or an authorization associated with the entity accessing the resource.

At 604, the method 600 includes determining a path of network traffic between the entity and the resource based at least in part on the authorization. In some examples, the path of network traffic may include one or more network devices.

At 606, the method 600 includes identifying one or more enforcement points associated with the path of network traffic. In some examples, a Software-Defined Networking (SDN) controller associated with the network may be configured to identify the one or more enforcement points associated with the path of network traffic. Additionally, or alternatively, the SDN controller may identify the one or more enforcement points based at least in part on an inventory storing information associated with the network devices.

At 608, the method 600 includes mapping an operation of one or more operations associated with the intent-based security policy to an enforcement point of the one or more enforcement points having a capability to implement the operation of the intent-based security policy.

At 610, the method 600 includes generating a first chain of enforcement points based at least in part on mapping the one or more operations of the intent-based security policy to the one or more enforcement points.

At 612, the method 600 includes sending the one or more operations of the intent-based policy to the one or more enforcement points associated with the first chain of enforcement points.

In some examples, the first chain of enforcement points may include one or more first enforcement points. Additionally, or alternatively, the method 600 includes generating a second chain of enforcement points including one or more second enforcement points configured to implement the one or more operations associated with the intent-based security policy. In some examples, the one or more second enforcement points may be different from the one or more first enforcement points. Additionally, or alternatively, the method 600 includes determining that first performance metrics associated with the first chain of enforcement points is more favorable than second performance metrics associated with the second chain of enforcement points. In some examples, sending the one or more operations of the intent-based policy to the one or more enforcement points associated with the first chain of enforcement points may be based at least in part on determining that the first performance metrics are more favorable than the second performance metrics.

Additionally, or alternatively, the method 600 includes identifying, at the SDN controller and from a workload agent associated with the resource, application vulnerability information associated with the resource. Additionally, or alternatively, the method 600 includes determining that an intrusion prevention operation is required to access the resource based at least in part on the application vulnerability information. In some examples, generating the first chain of enforcement points may be further based at least in part on determining that an enforcement point of the one or more enforcement points associated with the first chain of enforcement points has the intrusion prevention operation.

In some examples, the operation may comprise at least one of an intrusion prevention operation, a malware protection operation, and/or a firewall operation.

Additionally, or alternatively, the method 600 includes generating a logical topology of the network including the path of network traffic and the first chain of enforcement points. Additionally, or alternatively, the method 600 includes generating a graphical user interface (GUI) configured to display on a computing device. In some examples, the GUI may include the logical topology of the network.

In some examples, the GUI may be further configured to receive an input from the computing device. Additionally, or alternatively, the method 600 includes receiving, via the GUI, input data representing the input configured to modify the first chain of enforcement points. Additionally, or alternatively, the method 600 includes generating, based at least in part on the input data, a second chain of enforcement points.

In some examples, the input configured to modify the first chain of enforcement points may comprise at least one of a first input configured to add a new enforcement point to the one or more enforcement points of the network, a second input configured to remove an enforcement point of the one or more enforcement points from the network, a third input configured to modify a configuration of one or more of the enforcement points associated with the path of network traffic, and/or a fourth input configured to modify the intent-based security policy.

Figure 7:
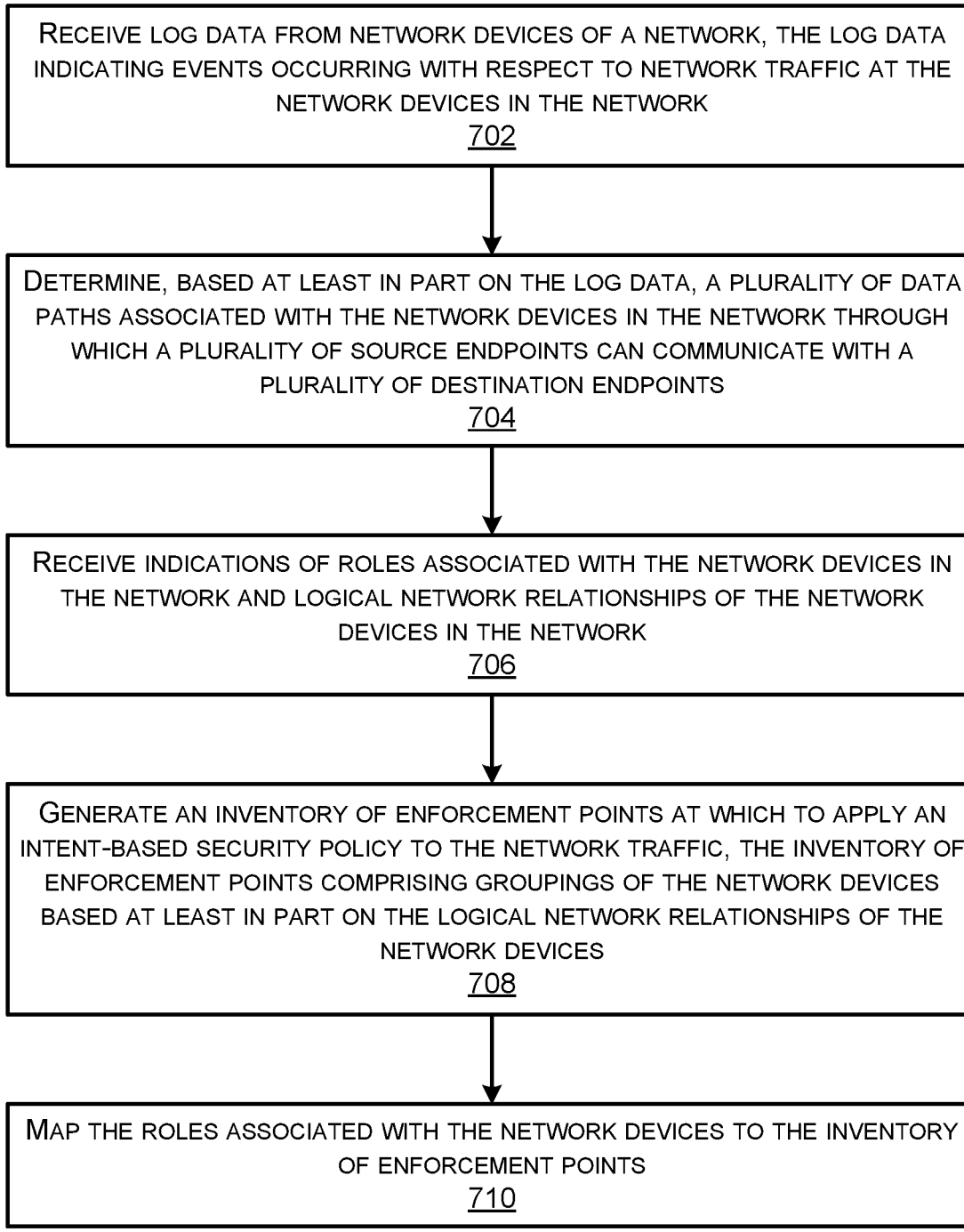
FIG. 7 illustrates a flow diagram of an example method for a network controller to generate an inventory of enforcement points using network data collected from network devices and generate a network topology of the enforcement points based on the inventory of enforcement points using the techniques described herein.

FIG. 7 illustrates a flow diagram of an example method 700 for a network controller associated with a managed network to generate an inventory of enforcement points using network data collected from network devices and generate a network topology of the enforcement points based on the inventory of enforcement points using the techniques described herein. In some examples, the managed network, the network controller, the inventory of enforcement points, the network data, the network devices, the enforcement points, and/or the network topology may be configured as the computing resource network 102, the network controller 104, the endpoint inventory 202, the network data 204, the network devices 206, the enforcement points 110, and/or the network topology 208 as described with respect to FIG. 2.

At 702, the method 700 includes receiving log data from network devices of a network. In some examples, the log data may indicate events occurring with respect to network traffic at the network devices in the network. Additionally, or alternatively, a Software-Defined Networking (SDN) controller may be configured to receive the log data from the network devices.

At 704, the method 700 includes determining a plurality of data paths associated with the network devices in the network through which a plurality of source endpoints can communicate with a plurality of destination endpoints. In some examples, determining the plurality of data paths may be based at least in part on the log data. Additionally, or alternatively, the SDN controller may be configured to determine the plurality of data paths.

At 706, the method 700 includes receiving indications of roles associated with the network devices in the network and logical network relationships of the network devices in the network. Additionally, or alternatively, the SDN controller may be configured to receive the indications of the roles and/or the logical network relationships of the network devices in the network.

At 708, the method 700 includes generating an inventory of enforcement points at which to apply an intent-based security policy to the network traffic. In some examples, the inventory of enforcement points may comprise groupings of the network devices based at least in part on the logical network relationships of the network devices. Additionally, or alternatively, the SDN controller may be configured to generate the inventory of enforcement points.

At 710, the method 700 includes mapping the roles associated with the network devices to the inventory of enforcement points. In some examples, the SDN controller may be configured to map the roles associated with the network devices to the inventory of enforcement points.

In some examples, the log data may be log data received at a first time. Additionally, or alternatively, the method 700 includes identifying, based at least in part the intent-based security policy, a first event associated with the network traffic that is expected to occur at a first enforcement point of the inventory of enforcement points at a second time that is subsequent to the first time. Additionally, or alternatively, the method 700 includes receiving second log data from the network devices at a third time that is subsequent to the second time. In some examples, the second log data may indicate the events occurring with respect to the network traffic at the network devices in the network. Additionally, or alternatively, the method 700 includes determining, based at least in part on the second log data, that the first event is absent from the second log data. Additionally, or alternatively, the method 700 includes updating the inventory of enforcement points to replace the first enforcement point with a second enforcement point.

In some examples, the logical network relationships may indicate, for an individual network device of the network devices in the network, a first physical location of the individual network device, second physical locations encompassing the first physical location, and/or third physical locations encompassed by the first physical location.

In some examples, the inventory of enforcement points is a first inventory of enforcement points. Additionally, or alternatively, the method 700 includes receiving an indication that a new network device is associated with the network. In some examples, the indication may include a first tag indicating a role associated with the new network device and a second tag indicating a logical network relationship of the new network device in the network. Additionally, or alternatively, the method 700 includes generating a second inventory of enforcement points based at least in part on the new network device. Additionally, or alternatively, the method 700 includes mapping the role associated with the new network device to the second inventory of the enforcement points.

Additionally, or alternatively, the method 700 includes generating a first logical topology of the network indicating the data paths, the network devices associated with the inventory of enforcement points, the roles associated with the network devices associated with the inventory of enforcement points, and/or the logical network relationships of the network devices associated with the inventory of enforcement points. Additionally, or alternatively, the method 700 includes generating a graphical user interface (GUI) configured to display on a computing device. In some examples, the GUI may include the first logical topology of the network.

In some examples, the GUI may be further configured to receive an input from the computing device. Additionally, or alternatively, the method 700 includes receiving, via the GUI, input data representing the input indicating a connection between at least a first network device of a first grouping of the groupings of the network devices and a second network device of a second grouping of the groupings of the network devices. Additionally, or alternatively, the method 700 includes generating, based at least in part on the input data, a second logical topology of the network indicating the data paths, the network devices associated with the inventory of enforcement points, the roles associated with the network devices associated with the inventory of enforcement points, the logical network relationships of the network devices associated with the inventory of enforcement points, and/or the connection. Additionally, or alternatively, the method 700 includes causing the GUI to display the second logical topology of the network.

Additionally, or alternatively, the method 700 includes receiving indications of physical locations of the network devices in the networks. Additionally, or alternatively, the method 700 includes determining, based at least in part on the roles associated with the network devices and the physical locations of the network devices, a connection between at least a first network device of a first grouping of the groupings of the network devices and a second network device of a second grouping of the groupings of the network devices. Additionally, or alternatively, the method 700 includes generating, based at least in part on determining the connection, a second logical topology of the network indicating the data paths, the network devices associated with the inventory of enforcement points, the roles associated with the network devices associated with the inventory of enforcement points, the logical network relationships of the network devices associated with the inventory of enforcement points, and/or the connection. Additionally, or alternatively, the method 700 includes causing the GUI to display the second logical topology of the network.

Figure 8:
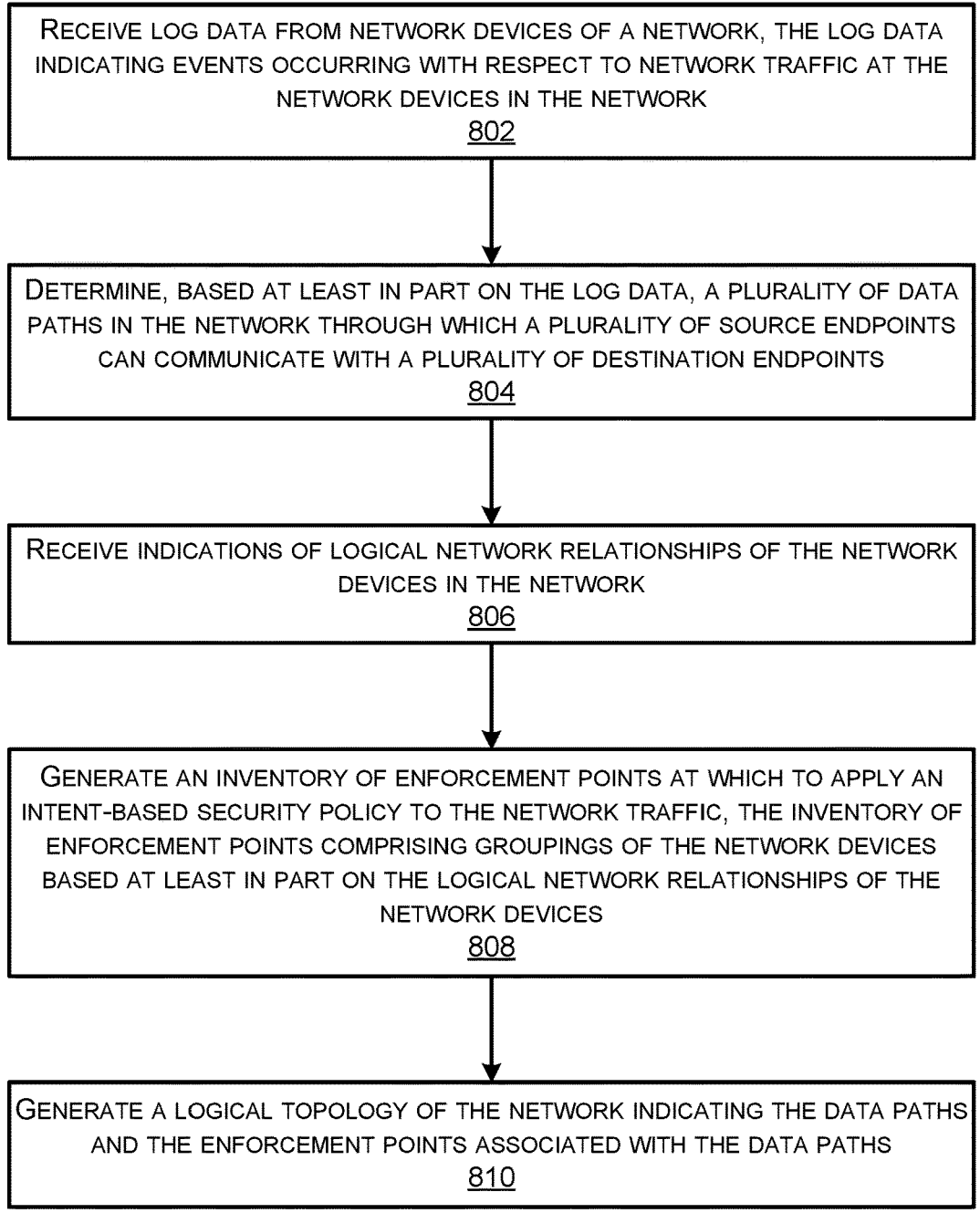
FIG. 8 illustrates a flow diagram of an example method for a network controller to generate an inventory of enforcement points using network data collected from network devices and map roles of the network devices to the inventory of enforcement points using the techniques described herein.

FIG. 8 illustrates a flow diagram of an example method 800 for a network controller to generate an inventory of enforcement points using network data collected from network devices and map roles of the network devices to the inventory of enforcement points using the techniques described herein. In some examples, the managed network, the network controller, the inventory of enforcement points, the network data, the network devices, and/or the enforcement points may be configured as the computing resource network 102, the network controller 104, the endpoint inventory 202, the network data 204, the network devices 206, and/or the enforcement points 110 as described with respect to FIG. 2.

At 802, the method 800 includes receiving log data from network devices of a network. In some examples, the log data may indicate events occurring with respect to network traffic at the network devices in the network. Additionally, or alternatively, a Software-Defined Networking (SDN) controller may be configured to receive the log data from the network devices.

At 804, the method 800 includes determining a plurality of data paths associated with the network devices in the network through which a plurality of source endpoints can communicate with a plurality of destination endpoints. In some examples, determining the plurality of data paths may be based at least in part on the log data. Additionally, or alternatively, the SDN controller may be configured to determine the plurality of data paths.

At 806, the method 800 includes receiving indications of logical network relationships of the network devices in the network. In some examples, the SDN controller may be configured to receive the indications of the logical network relationships of the network devices in the network.

At 808, the method 800 includes generating an inventory of enforcement points at which to apply an intent-based security policy to the network traffic. In some examples, the inventory of enforcement points may comprise groupings of the network devices based at least in part on the logical network relationships of the network devices. Additionally, or alternatively, the SDN controller may be configured to generate the inventory of enforcement points.

At 810, the method 800 includes generating a logical topology of the network indicating the data paths and the enforcement points associated with the data paths. In some examples, the SDN controller may be configured to generate the logical topology of the network.

Additionally, or alternatively, the method 800 includes receiving indications of roles associated with the network devices in the network. Additionally, or alternatively, the method 800 includes mapping the roles associated with the network devices to the inventory of enforcement points. In some examples, generating the logical topology of the network may be based at least in part on mapping the roles associated with the network devices to the inventory of enforcement points.

In some examples, the log data is first log data received at a first time. Additionally, or alternatively, the method 800 includes identifying, based at least in part the intent-based security policy, a first event associated with the network traffic that is expected to occur at a first enforcement point of the inventory of enforcement points at a second time that is subsequent to the first time. Additionally, or alternatively, the method 800 includes receiving second log data from the network devices at a third time that is subsequent to the second time. In some examples, the second log data may indicate the events occurring with respect to the network traffic at the network devices in the network. Additionally, or alternatively, the method 800 includes determining, based at least in part on the second log data, that the first event is absent from the second log data. Additionally, or alternatively, the method 800 includes updating the inventory of enforcement points to replace the first enforcement point with a second enforcement point.

In some examples, the logical network relationships may indicate, for an individual network device of the network devices in the network, a first physical location of the individual network device, second physical locations encompassing the first physical location, and/or third physical locations encompassed by the first physical location.

Additionally, or alternatively, the method 800 includes generating a graphical user interface (GUI) configured to display on a computing device. In some examples, the GUI may include the first logical topology of the network.

In some examples, the GUI may be further configured to receive an input from the computing device. Additionally, or alternatively, the method 800 includes receiving, via the GUI, input data representing the input indicating a connection between at least a first network device of a first grouping of the groupings of the network devices and a second network device of a second grouping of the groupings of the network devices. Additionally, or alternatively, the method 800 includes generating, based at least in part on the input data, a second logical topology of the network indicating the data paths, the network devices associated with the inventory of enforcement points, the roles associated with the network devices associated with the inventory of enforcement points, the logical network relationships of the network devices associated with the inventory of enforcement points, and/or the connection. Additionally, or alternatively, the method 800 includes causing the GUI to display the second logical topology of the network.

Additionally, or alternatively, the method 800 includes receiving indications of physical locations of the network devices in the networks. Additionally, or alternatively, the method 800 includes determining, based at least in part on the roles associated with the network devices and the physical locations of the network devices, a connection between at least a first network device of a first grouping of the groupings of the network devices and a second network device of a second grouping of the groupings of the network devices. Additionally, or alternatively, the method 800 includes generating, based at least in part on determining the connection, a second logical topology of the network indicating the data paths, the network devices associated with the inventory of enforcement points, the roles associated with the network devices associated with the inventory of enforcement points, the logical network relationships of the network devices associated with the inventory of enforcement points, and/or the connection. Additionally, or alternatively, the method 800 includes causing the GUI to display the second logical topology of the network.

Figure 9:
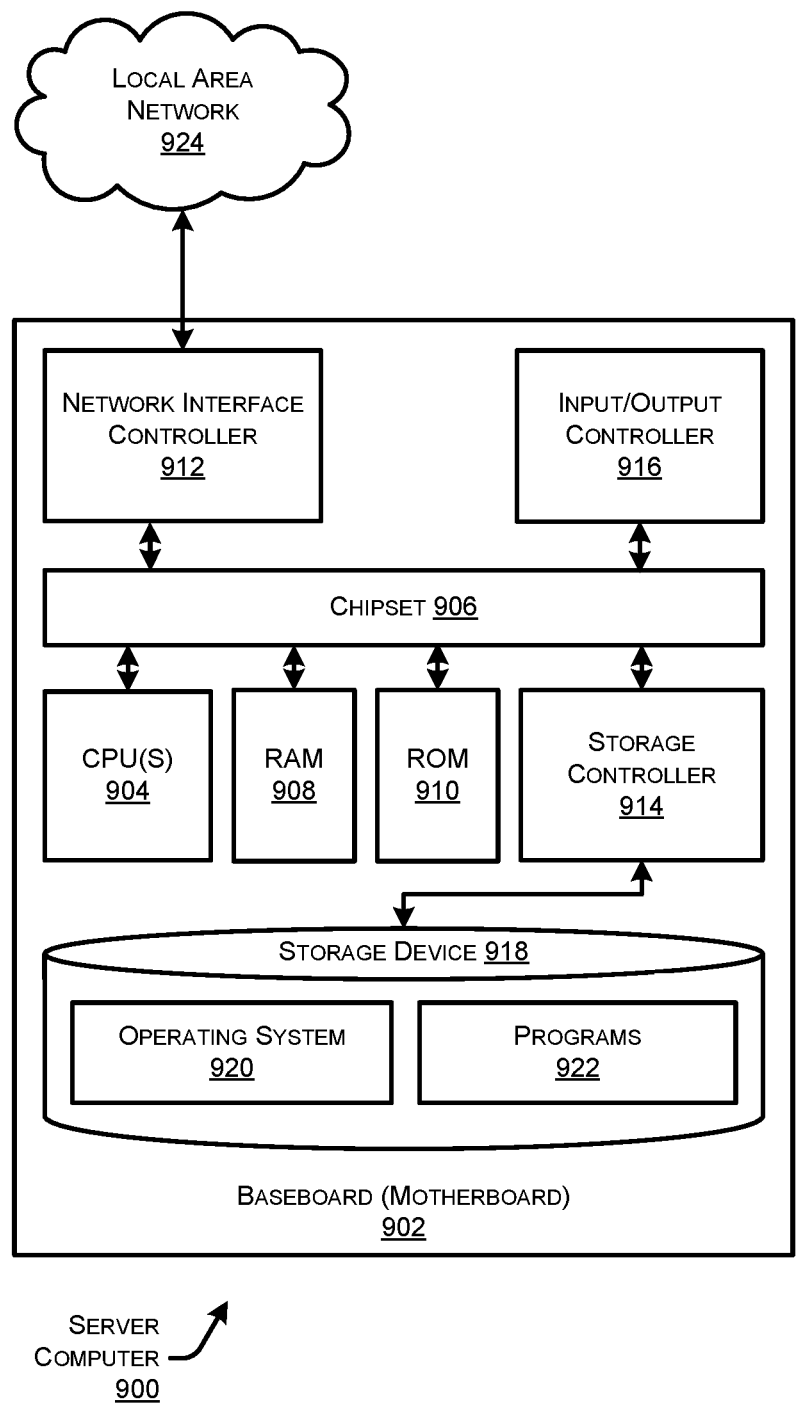
FIG. 9 is a computer architecture diagram showing an illustrative computer hardware architecture for implementing a server device that can be utilized to implement aspects of the various technologies presented herein.

FIG. 9 shows an example computer architecture for a computing device (or network routing device) 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The computing device 900 may, in some examples, correspond to a physical server associated with the computing resource network(s) 102, the cloud service(s) 114, the data center(s) 116, and/or the campus domain 112, and/or any other source endpoint and/or destination endpoint as described with respect to FIGS. 1-4.

The computing device 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computing device 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computing device 900. The chipset 906 can further provide an interface to a computer-readable storage medium such as a read-only memory ("ROM") 910 or non-volatile RAM ("NVRAM") for storing basic routines that help to startup the computing device 900 and to transfer information between the various components and devices. The ROM 910 or NVRAM can also store other software components necessary for the operation of the computing device 900 in accordance with the configurations described herein.

The computing device 900 can operate in a networked environment using logical connections to remote computing devices and computer systems through a network, such as the network 924. The chipset 906 can include functionality for providing network connectivity through a NIC 912, such as a gigabit Ethernet adapter. The NIC 912 is capable of connecting the computing device 900 to other computing devices over the network 924. It should be appreciated that multiple NICs 912 can be present in the computing device 900, connecting the computer to other types of networks and remote computer systems.

The computing device 900 can be connected to a storage device 918 that provides non-volatile storage for the computing device 900. The storage device 918 can store an operating system 920, programs 922, and data, which have been described in greater detail herein. The storage device 918 can be connected to the computing device 900 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the computing device 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 can further read information from the storage device 918 by detecting the physical states or characteristics of one or more particular locations within the physical storage units.

In addition to the mass storage device 918 described above, the computing device 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 900. In some examples, the operations performed by the computing resource network 102, and or any components included therein, may be supported by one or more devices similar to computing device 900. Stated otherwise, some or all of the operations performed by the computing resource network(s) 102, the cloud service(s) 114, the data center(s) 116, the campus domain 112, the enforcement points 110, any other source endpoint and/or destination endpoint and/or any components included therein, as described in FIGS. 1-4, may be performed by one or more computing device 900 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the computing device 900. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computing device 900.

In one embodiment, the storage device 918 or other computer-readable storage media is encoded with computer-executable instructions which, when loaded into the computing device 900, transform the computer from a general-purpose computing system into a special-purpose computer capable of implementing the embodiments described herein. These computer-executable instructions transform the computing device 900 by specifying how the CPUs 904 transition between states, as described above. According to one embodiment, the computing device 900 has access to computer-readable storage media storing computer-executable instructions which, when executed by the computing device 900, perform the various processes described above with regard to FIGS. 5-8. The computing device 900 can also include computer-readable storage media having instructions stored thereupon for performing any of the other computer-implemented operations described herein.

The computing device 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computing device 900 might not include all of the components shown in FIG. 9, can include other components that are not explicitly shown in FIG. 9, or might utilize an architecture completely different than that shown in FIG. 9.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving data representing an intent-based security policy associated with a network, the intent-based security policy indicating an entity, a resource, and an authorization associated with the entity accessing the resource;
determining a path of network traffic between the entity and the resource based at least in part on the authorization, the path of network traffic including one or more network devices;
identifying, by a Software-Defined Networking (SDN) controller associated with the network and based at least in part on an inventory storing information associated with the network devices, one or more enforcement points associated with the path of network traffic;
determining that a first enforcement point of the one or more enforcement points associated with the path of network traffic has a first capability to implement at least a first portion of the intent-based security policy;
determining that a second enforcement point of the one or more enforcement points associated with the path of network traffic has a second capability to implement at least a second portion of the intent-based security policy;
generating a first chain of enforcement points based at least in part on the first enforcement point and the second enforcement point; and
sending the first portion of the intent-based security policy and the second portion of the intent-based security policy to the first chain of enforcement points.

2. The method of claim 1, further comprising:
determining that a third enforcement point of the one or more enforcement points associated with the path of network traffic has the first capability to implement at least the first portion of the intent-based security policy;
determining that a fourth enforcement point of the one or more enforcement points associated with the path of network traffic has the second capability to implement at least the second portion of the intent-based security policy;
generating a second chain of enforcement points based at least in part on the third enforcement point and the fourth enforcement point;
determining that first performance metrics associated with the first chain of enforcement points is more favorable than second performance metrics associated with the second chain of enforcement points; and
wherein sending the first portion of the intent-based policy and the second portion of the intent-based policy to the first chain of enforcement points is based at least in part on determining that the first performance metrics are more favorable than the second performance metrics.

3. The method of claim 1, further comprising:
identifying, at the SDN controller and from a workload agent associated with the resource, application vulnerability information associated with the resource;
determining that an intrusion prevention capability is required to access the resource based at least in part on the application vulnerability information; and
wherein generating the first chain of enforcement points is further based at least in part on determining that one of the first enforcement point or the second enforcement point has the intrusion prevention capability.

4. The method of claim 1, wherein the first capability comprises at least one of:

an intrusion prevention capability;
an application security capability;
a web application firewall capability;
a denial of service attack prevention capability;
a uniform resource locator (URL) filtering and categorization capability;
an application programming interface (API) inspection capability;
a malware protection capability; or
a firewall capability.

5. The method of claim 1, further comprising:
generating a logical topology of the network including the path of network traffic and the first chain of enforcement points; and
generating a graphical user interface (GUI) configured to display on a computing device, the GUI including the logical topology of the network.

6. The method of claim 5, wherein the GUI is further configured to receive an input from the computing device, and the method further comprising:
receiving, via the GUI, input data representing the input configured to modify the first chain of enforcement points; and
generating, based at least in part on the input data, a second chain of enforcement points.

7. The method of claim 6, wherein the input configured to modify the first chain of enforcement points comprises at least one of:
a first input configured to add a new enforcement point to the one or more enforcement points of the network;
a second input configured to remove an enforcement point of the one or more enforcement points from the network;
a third input configured to modify a configuration of one or more of the enforcement points associated with the path of network traffic; or
a fourth input configured to modify the intent-based security policy.

8. One or more non-transitory computer-readable media storing instructions executable by a processor, wherein the instructions, when executed, cause the processor to perform operations comprising:
receiving data representing an intent-based security policy associated with a network, the intent-based security policy indicating an entity, a resource, and an authorization associated with the entity accessing the resource;
determining a path of network traffic between the entity and the resource based at least in part on the authorization, the path of network traffic including one or more network devices;
identifying, by a Software-Defined Networking (SDN) controller and based at least in part on an inventory storing information associated with the network devices, one or more enforcement points associated with the path of network traffic;
mapping an operation of one or more operations associated with the intent-based security policy to an enforcement point of the one or more enforcement points having a capability to implement the operation of the intent-based security policy;
generating a first chain of enforcement points based at least in part on mapping the one or more operations of the intent-based security policy to the one or more enforcement points; and
sending the one or more operations of the intent-based security policy to the one or more enforcement points associated with the first chain of enforcement points.

9. The one or more non-transitory computer-readable media of claim 8, wherein the first chain of enforcement points includes one or more first enforcement points, and the operations further comprising:
generating a second chain of enforcement points including one or more second enforcement points configured to implement the one or more operations associated with the intent-based security policy, the one or more second enforcement points being different from the one or more first enforcement points;
determining that first performance metrics associated with the first chain of enforcement points is more favorable than second performance metrics associated with the second chain of enforcement points; and
wherein sending the one or more operations of the intent-based policy to the one or more enforcement points associated with the first chain of enforcement points is based at least in part on determining that the first performance metrics are more favorable than the second performance metrics.

10. The one or more non-transitory computer-readable media of claim 8, the operations further comprising:
identifying, at the SDN controller and from a workload agent associated with the resource, application vulnerability information associated with the resource;
determining that an intrusion prevention operation is required to access the resource based at least in part on the application vulnerability information; and
wherein generating the first chain of enforcement points is further based at least in part on determining that an enforcement point of the one or more enforcement points associated with the first chain of enforcement points has the intrusion prevention operation.

11. The one or more non-transitory computer-readable media of claim 8, wherein the operation comprises at least one of:
an intrusion prevention operation;
a malware protection operation; or
a firewall operation.

12. The one or more non-transitory computer-readable media of claim 8, the operations further comprising:
generating a logical topology of the network including the path of network traffic and the first chain of enforcement points; and
generating a graphical user interface (GUI) configured to display on a computing device, the GUI including the logical topology of the network.

13. The one or more non-transitory computer-readable media of claim 12, wherein the GUI is further configured to receive an input from the computing device, and the operations further comprising:
receiving, via the GUI, input data representing the input configured to modify the first chain of enforcement points; and
generating, based at least in part on the input data, a second chain of enforcement points.

14. The one or more non-transitory computer-readable media of claim 13, wherein the input configured to modify the first chain of enforcement points comprises at least one of:
a first input configured to add a new enforcement point to the one or more enforcement points of the network;

a second input configured to remove an enforcement point of the one or more enforcement points from the network;

a third input configured to modify a configuration of one or more of the enforcement points associated with the path of network traffic; or a fourth input configured to modify the intent-based security policy.

15. A method comprising:

receiving data representing an intent-based security policy associated with a network, the intent-based security policy indicating an entity, a resource, and an authorization associated with the entity accessing the resource;

determining a path of network traffic between the entity and the resource based at least in part on the authorization, the path of network traffic including one or more network devices;

identifying, by a Software-Defined Networking (SDN) controller and based at least in part on an inventory storing information associated with the network devices, one or more enforcement points associated with the path of network traffic;

mapping an operation of one or more operations associated with the intent-based security policy to an enforcement point of the one or more enforcement points having a capability to implement the operation of the intent-based security policy;

generating a first chain of enforcement points based at least in part on mapping the one or more operations of the intent-based security policy to the one or more enforcement points; and sending the one or more operations of the intent-based security policy to the one or more enforcement points associated with the chain of enforcement points.

16. The method of claim 15, wherein the first chain of enforcement points includes one or more first enforcement points, and the method further comprising generating a second chain of enforcement points including one or more second enforcement points configured to implement the one or more operations associated with the intent-based security policy, the one or more second enforcement points being different from the one or more first enforcement points;

determining that first performance metrics associated with the first chain of enforcement points is more favorable than second performance metrics associated with the second chain of enforcement points; and wherein sending the one or more operations of the intent-based policy to the one or more enforcement points associated with the first chain of enforcement points is based at least in part on determining that the first performance metrics are more favorable than the second performance metrics.

17. The method of claim 15, further comprising:

identifying, at the SDN controller and from a workload agent associated with the resource, application vulnerability information associated with the resource;

determining that an intrusion prevention operation is required to access the resource based at least in part on the application vulnerability information; and wherein generating the first chain of enforcement points is further based at least in part on determining that an enforcement point of the one or more enforcement points associated with the first chain of enforcement points has the intrusion prevention operation.

18. The method of claim 15, wherein the operation comprises at least one of:

an intrusion prevention operation;

a malware protection operation; or a firewall operation.

19. The method of claim 15, further comprising:

generating a logical topology of the network including the path of network traffic and the first chain of enforcement points; and generating a graphical user interface (GUI) configured to display on a computing device, the GUI including the logical topology of the network.

20. The method of claim 19, wherein the GUI is further configured to receive an input from the computing device, and the method further comprising:

receiving, via the GUI, input data representing the input configured to modify the first chain of enforcement points, wherein the input includes at least one of:

a first input configured to add a new enforcement point to the one or more enforcement points of the network;

a second input configured to remove an enforcement point of the one or more enforcement points from the network;

a third input configured to modify a configuration of one or more of the enforcement points associated with the path of network traffic; or a fourth input configured to modify the intent-based security policy; and generating, based at least in part on the input data, a second chain of enforcement points.

* * * * *